(12) United States Patent
Vorbach et al.

(10) Patent No.: US 7,840,842 B2
(45) Date of Patent: *Nov. 23, 2010

(54) METHOD FOR DEBUGGING RECONFIGURABLE ARCHITECTURES

(76) Inventors: Martin Vorbach, Gotthardstr. 117A, 80689 München (DE); Frank May, An der Tuchbleiche 12, 81927 München (DE); Armin Nückel, Drosselweg 4, 76777 Neupotz (DE)

( * ) Notice: Subject to any disclaimer, the term of this patent is extended or adjusted under 35 U.S.C. 154(b) by 339 days.

This patent is subject to a terminal disclaimer.

(21) Appl. No.: 11/890,094

(22) Filed: Aug. 3, 2007

(65) Prior Publication Data

US 2009/0006895 A1 Jan. 1, 2009

Related U.S. Application Data

(63) Continuation of application No. 09/967,497, filed on Sep. 28, 2001, now Pat. No. 7,266,725.

(30) Foreign Application Priority Data

Sep. 3, 2001 (DE) ................................ 101 42 904
Sep. 11, 2001 (DE) ................................ 101 44 733

(51) Int. Cl.
*G06F 11/00* (2006.01)
(52) U.S. Cl. .......................................... 714/25; 714/38
(58) Field of Classification Search .................. 714/25, 714/30, 31, 33, 38, 39, 733, 734, 725; 712/227; 713/100
See application file for complete search history.

(56) References Cited

U.S. PATENT DOCUMENTS

| 2,067,477 | A | 1/1937 | Cooper |
| 3,242,998 | A | 3/1966 | Gubbins |
| 3,681,578 | A | 8/1972 | Stevens |
| 3,757,608 | A | 9/1973 | Willner |
| 3,855,577 | A | 12/1974 | Vandierendonck |
| 4,233,667 | A | 11/1980 | Devine et al. |
| 4,414,547 | A | 11/1983 | Knapp et al. |
| 4,498,134 | A | 2/1985 | Hansen et al. |
| 4,498,172 | A | 2/1985 | Bhavsar |
| 4,566,102 | A | 1/1986 | Hefner |
| 4,489,857 | A | 2/1986 | Agrawal et al. |
| 4,571,736 | A | 2/1986 | Agrawal et al. |

(Continued)

FOREIGN PATENT DOCUMENTS

DE  42 21 278   1/1994

(Continued)

OTHER PUBLICATIONS

Abnous, A., et al., "The Pleiades Architecture," Chapter I of *The Application of Programmable DSPs in Mobile Communications*, A. Gatherer and A. Auslander, Ed., Wiley, 2002, pp. 1-33.

(Continued)

*Primary Examiner*—Dieu-Minh Le
(74) *Attorney, Agent, or Firm*—Kenyon & Kenyon LLP

(57) ABSTRACT

A method is described for debugging reconfigurable hardware. In one example embodiment, debugging information is written for each configuration cycle into a memory which is then evaluated by a debugger.

13 Claims, 3 Drawing Sheets

U.S. PATENT DOCUMENTS

| | | | |
|---|---|---|---|
| 4,590,583 A | 5/1986 | Miller |
| 4,591,979 A | 5/1986 | Iwashita |
| 4,623,997 A | 11/1986 | Tulpule |
| 4,663,706 A | 5/1987 | James et al. |
| 4,667,190 A | 5/1987 | Fant et al. |
| 4,682,284 A | 7/1987 | Schrofer |
| 4,686,386 A | 8/1987 | Tadao |
| 4,706,216 A | 11/1987 | Carter |
| 4,720,778 A | 1/1988 | Hall et al. |
| 4,720,780 A | 1/1988 | Dolecek |
| 4,739,474 A | 4/1988 | Holsztynski |
| 4,761,755 A | 8/1988 | Ardini et al. |
| 4,791,603 A | 12/1988 | Henry |
| 4,811,214 A | 3/1989 | Nosenchuck et al. |
| 4,852,043 A | 7/1989 | Guest |
| 4,852,048 A | 7/1989 | Morton |
| 4,860,201 A | 8/1989 | Miranker et al. |
| 4,870,302 A | 9/1989 | Freeman |
| 4,882,687 A | 11/1989 | Gordon |
| 4,884,231 A | 11/1989 | Mor et al. |
| 4,891,810 A | 1/1990 | de Corlieu et al. |
| 4,901,268 A | 2/1990 | Judd |
| 4,910,665 A | 3/1990 | Mattheyses et al. |
| 4,918,440 A | 4/1990 | Furtek et al. |
| 4,959,781 A | 9/1990 | Rubinstein et al. |
| 4,967,340 A | 10/1990 | Dawes |
| 4,972,314 A | 11/1990 | Getzinger et al. |
| 4,992,933 A | 2/1991 | Taylor |
| 5,010,401 A | 4/1991 | Murakami et al. |
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |
| 5,034,914 A | 7/1991 | Osterlund |
| 5,036,473 A | 7/1991 | Butts et al. |
| 5,041,924 A | 8/1991 | Blackborow et al. |
| 5,043,978 A | 8/1991 | Nagler et al. |
| 5,047,924 A | 9/1991 | Matsubara et al. |
| 5,055,997 A | 10/1991 | Sluijter et al. |
| 5,065,308 A | 11/1991 | Evans |
| 5,072,178 A | 12/1991 | Matsumoto |
| 5,076,482 A | 12/1991 | Kozyrski |
| 5,081,375 A | 1/1992 | Pickett et al. |
| 5,099,447 A | 3/1992 | Myszewski |
| 5,103,311 A | 4/1992 | Sluijter et al. |
| 5,109,503 A | 4/1992 | Cruickshank et al. |
| 5,113,498 A | 5/1992 | Evan et al. |
| 5,115,510 A | 5/1992 | Okamoto et al. |
| 5,123,109 A | 6/1992 | Hillis |
| 5,125,801 A | 6/1992 | Nabity et al. |
| 5,128,559 A | 7/1992 | Steele |
| 5,142,469 A | 8/1992 | Weisenborn |
| 5,144,166 A | 9/1992 | Camarota et al. |
| 5,193,202 A | 3/1993 | Lee et al. |
| 5,203,005 A | 4/1993 | Horst |
| 5,204,935 A | 4/1993 | Mihara et al. |
| 5,208,491 A | 5/1993 | Ebeling et al. |
| 5,212,716 A | 5/1993 | Ferraiolo et al. |
| 5,212,777 A | 5/1993 | Gove et al. |
| 5,218,302 A | 6/1993 | Loewe et al. |
| 5,226,122 A | 7/1993 | Thayer et al. |
| RE34,363 E | 8/1993 | Freeman |
| 5,233,539 A | 8/1993 | Agrawal et al. |
| 5,237,686 A | 8/1993 | Asano et al. |
| 5,243,238 A | 9/1993 | Kean |
| 5,247,689 A | 9/1993 | Ewert |
| RE34,444 E | 11/1993 | Kaplinsky |
| 5,274,593 A | 12/1993 | Proebsting |
| 5,276,836 A | 1/1994 | Fukumaru et al. |
| 5,287,472 A | 2/1994 | Horst |
| 5,287,511 A | 2/1994 | Robinson et al. |
| 5,287,532 A | 2/1994 | Hunt |
| 5,294,119 A | 3/1994 | Vincent et al. |
| 5,301,284 A | 4/1994 | Estes et al. |
| 5,301,344 A | 4/1994 | Kolchinsky |
| 5,303,172 A | 4/1994 | Magar et al. |
| 5,311,079 A | 5/1994 | Ditlow et al. |
| 5,327,125 A | 7/1994 | Iwase et al. |
| 5,336,950 A | 8/1994 | Popli et al. |
| 5,343,406 A | 8/1994 | Freeman et al. |
| 5,347,639 A | 9/1994 | Rechtschaffen et al. |
| 5,349,193 A | 9/1994 | Mott et al. |
| 5,353,432 A | 10/1994 | Richek et al. |
| 5,355,508 A | 10/1994 | Kan |
| 5,361,373 A | 11/1994 | Gilson |
| 5,365,125 A | 11/1994 | Goetting et al. |
| 5,379,444 A | 1/1995 | Mumme |
| 5,386,154 A | 1/1995 | Goetting et al. |
| 5,386,518 A | 1/1995 | Reagle et al. |
| 5,392,437 A | 2/1995 | Matter et al. |
| 5,408,643 A | 4/1995 | Katayose |
| 5,410,723 A | 4/1995 | Schmidt et al. |
| 5,412,795 A | 5/1995 | Larson |
| 5,418,952 A | 5/1995 | Morley et al. |
| 5,418,953 A | 5/1995 | Hunt et al. |
| 5,421,019 A | 5/1995 | Holsztynski et al. |
| 5,422,823 A | 6/1995 | Agrawal et al. |
| 5,425,036 A | 6/1995 | Liu et al. |
| 5,426,378 A | 6/1995 | Ong |
| 5,428,526 A | 6/1995 | Flood et al. |
| 5,430,687 A | 7/1995 | Hung et al. |
| 5,440,245 A | 8/1995 | Galbraith et al. |
| 5,440,538 A | 8/1995 | Olsen et al. |
| 5,442,790 A | 8/1995 | Nosenchuck |
| 5,444,394 A | 8/1995 | Watson et al. |
| 5,448,186 A | 9/1995 | Kawata |
| 5,450,022 A | 9/1995 | New |
| 5,455,525 A | 10/1995 | Ho et al. |
| 5,457,644 A | 10/1995 | McCollum |
| 5,465,375 A | 11/1995 | Thepaut et al. |
| 5,469,003 A | 11/1995 | Kean |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,477,525 A | 12/1995 | Okabe |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,497,498 A | 3/1996 | Taylor |
| 5,504,439 A | 4/1996 | Tavana |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agrawal et al. |
| 5,521,837 A | 5/1996 | Frankle et al. |
| 5,522,083 A | 5/1996 | Gove et al. |
| 5,525,971 A | 6/1996 | Flynn |
| 5,530,873 A | 6/1996 | Takano |
| 5,530,946 A | 6/1996 | Bouvier et al. |
| 5,532,693 A | 7/1996 | Winters et al. |
| 5,532,957 A | 7/1996 | Malhi |
| 5,535,406 A | 7/1996 | Kolchinsky |
| 5,537,057 A | 7/1996 | Leong et al. |
| 5,537,580 A | 7/1996 | Giomi et al. |
| 5,537,601 A | 7/1996 | Kimura et al. |
| 5,541,530 A | 7/1996 | Cliff et al. |
| 5,544,336 A | 8/1996 | Kato et al. |
| 5,548,773 A | 8/1996 | Kemeny et al. |
| 5,550,782 A | 8/1996 | Cliff et al. |

| | | | | | |
|---|---|---|---|---|---|
| 5,555,434 A | 9/1996 | Carlstedt | 5,781,756 A | 7/1998 | Hung |
| 5,559,450 A | 9/1996 | Ngai et al. | 5,784,636 A | 7/1998 | Rupp |
| 5,561,738 A | 10/1996 | Kinerk et al. | 5,794,059 A | 8/1998 | Barker et al. |
| 5,570,040 A | 10/1996 | Lytle et al. | 5,794,062 A | 8/1998 | Baxter |
| 5,572,710 A | 11/1996 | Asano et al. | 5,801,547 A | 9/1998 | Kean |
| 5,574,930 A | 11/1996 | Halverson, Jr. et al. | 5,801,715 A | 9/1998 | Norman |
| 5,581,731 A | 12/1996 | King et al. | 5,801,958 A | 9/1998 | Dangelo et al. |
| 5,583,450 A | 12/1996 | Trimberger et al. | 5,802,290 A | 9/1998 | Casselman |
| 5,586,044 A | 12/1996 | Agrawal et al. | 5,804,986 A | 9/1998 | Jones |
| 5,587,921 A | 12/1996 | Agrawal et al. | 5,815,004 A | 9/1998 | Trimberger et al. |
| 5,588,152 A | 12/1996 | Dapp et al. | 5,815,715 A | 9/1998 | Kayhan |
| 5,590,345 A | 12/1996 | Barker et al. | 5,815,726 A | 9/1998 | Cliff |
| 5,590,348 A | 12/1996 | Phillips et al. | 5,821,774 A | 10/1998 | Veytsman et al. |
| 5,596,742 A | 1/1997 | Agarwal et al. | 5,828,229 A | 10/1998 | Cliff et al. |
| 5,600,265 A | 2/1997 | El Gamal Abbas et al. | 5,828,858 A | 10/1998 | Athanas et al. |
| 5,600,597 A | 2/1997 | Kean et al. | 5,831,448 A | 11/1998 | Kean |
| 5,600,845 A | 2/1997 | Gilson | 5,838,165 A | 11/1998 | Chatter |
| 5,606,698 A | 2/1997 | Powell | 5,841,973 A | 11/1998 | Cooke et al. |
| 5,608,342 A | 3/1997 | Trimberger | 5,844,422 A | 12/1998 | Trimberger et al. |
| 5,611,049 A | 3/1997 | Pitts | 5,844,888 A | 12/1998 | Narjjyka |
| 5,617,547 A | 4/1997 | Feeney et al. | 5,848,238 A | 12/1998 | Shimomura et al. |
| 5,617,577 A | 4/1997 | Barker et al. | 5,854,918 A | 12/1998 | Baxter |
| 5,619,720 A | 4/1997 | Garde et al. | 5,857,097 A | 1/1999 | Henzinger et al. |
| 5,625,806 A | 4/1997 | Kromer | 5,857,109 A | 1/1999 | Taylor |
| 5,625,836 A | 4/1997 | Barker et al. | 5,859,544 A | 1/1999 | Norman |
| 5,627,992 A | 5/1997 | Baror | 5,860,119 A | 1/1999 | Dockser |
| 5,634,131 A | 5/1997 | Matter et al. | 5,862,403 A | 1/1999 | Kanai et al. |
| 5,635,851 A | 6/1997 | Tavana | 5,865,239 A | 2/1999 | Carr |
| 5,642,058 A | 6/1997 | Trimberger et al. | 5,867,691 A | 2/1999 | Shiraishi |
| 5,646,544 A | 7/1997 | Iadanza | 5,867,723 A | 2/1999 | Peters et al. |
| 5,646,545 A | 7/1997 | Trimberger et al. | 5,870,620 A | 2/1999 | Kadosumi et al. |
| 5,649,176 A | 7/1997 | Selvidge et al. | 5,884,075 A | 3/1999 | Hester et al. |
| 5,649,179 A | 7/1997 | Steenstra et al. | 5,887,162 A | 3/1999 | Williams et al. |
| 5,652,529 A | 7/1997 | Gould et al. | 5,887,165 A | 3/1999 | Martel et al. |
| 5,652,894 A | 7/1997 | Hu et al. | 5,889,533 A | 3/1999 | Lee |
| 5,655,069 A | 8/1997 | Ogawara et al. | 5,889,982 A | 3/1999 | Rodgers et al. |
| 5,655,124 A | 8/1997 | Lin | 5,892,370 A | 4/1999 | Eaton et al. |
| 5,656,950 A | 8/1997 | Duong et al. | 5,892,961 A | 4/1999 | Trimberger |
| 5,657,330 A | 8/1997 | Matsumoto | 5,892,962 A | 4/1999 | Cloutier |
| 5,659,785 A | 8/1997 | Pechanek et al. | 5,894,565 A | 4/1999 | Furtek et al. |
| 5,659,797 A | 8/1997 | Zandveld et al. | 5,901,279 A | 5/1999 | Davis, III |
| 5,675,262 A | 10/1997 | Duong et al. | 5,915,123 A | 6/1999 | Mirsky et al. |
| 5,675,743 A | 10/1997 | Mavity | 5,924,119 A | 7/1999 | Sindhu et al. |
| 5,675,757 A | 10/1997 | Davidson et al. | 5,926,638 A | 7/1999 | Inoue |
| 5,680,583 A | 10/1997 | Kuijsten | 5,927,423 A | 7/1999 | Wada et al. |
| 5,682,491 A | 10/1997 | Pechanek et al. | 5,933,023 A | 8/1999 | Young |
| 5,687,325 A | 11/1997 | Chang | 5,933,642 A | 8/1999 | Baxter et al. |
| 5,694,602 A | 12/1997 | Smith | 5,936,424 A | 8/1999 | Young et al. |
| 5,696,791 A | 12/1997 | Yeung | 5,943,242 A | 8/1999 | Vorbach et al. |
| 5,696,976 A | 12/1997 | Nizar et al. | 5,956,518 A | 9/1999 | DeHon et al. |
| 5,701,091 A | 12/1997 | Kean | 5,960,193 A | 9/1999 | Guttag et al. |
| 5,705,938 A | 1/1998 | Kean | 5,960,200 A | 9/1999 | Eager et al. |
| 5,706,482 A | 1/1998 | Matsushima et al. | 5,966,143 A | 10/1999 | Breternitz, Jr. |
| 5,713,037 A | 1/1998 | Wilkinson et al. | 5,966,534 A | 10/1999 | Cooke et al. |
| 5,717,943 A | 2/1998 | Barker et al. | 5,970,254 A | 10/1999 | Cooke et al. |
| 5,732,209 A | 3/1998 | Vigil et al. | 5,978,260 A | 11/1999 | Trimberger et al. |
| 5,734,869 A | 3/1998 | Chen | 5,978,583 A | 11/1999 | Ekanadham et al. |
| 5,734,921 A | 3/1998 | Dapp et al. | 5,996,083 A | 11/1999 | Gupta et al. |
| 5,737,516 A | 4/1998 | Circello et al. | 5,999,990 A | 12/1999 | Sharrit et al. |
| 5,737,565 A | 4/1998 | Mayfield | 6,003,143 A | 12/1999 | Kim et al. |
| 5,742,180 A | 4/1998 | Detton et al. | 6,011,407 A | 1/2000 | New |
| 5,745,734 A | 4/1998 | Craft et al. | 6,014,509 A | 1/2000 | Furtek et al. |
| 5,748,872 A | 5/1998 | Norman | 6,020,758 A | 2/2000 | Patel et al. |
| 5,748,979 A | 5/1998 | Trimberger | 6,020,760 A | 2/2000 | Sample et al. |
| 5,752,035 A | 5/1998 | Trimberger | 6,021,490 A * | 2/2000 | Vorbach et al. ............. 713/100 |
| 5,754,459 A | 5/1998 | Telikepalli | 6,023,564 A | 2/2000 | Trimberger |
| 5,754,820 A | 5/1998 | Yamagami | 6,023,742 A | 2/2000 | Ebeling et al. |
| 5,754,827 A | 5/1998 | Barbier et al. | 6,026,481 A | 2/2000 | New et al. |
| 5,754,871 A | 5/1998 | Wilkinson et al. | 6,034,538 A | 3/2000 | Abramovici |
| 5,760,602 A | 6/1998 | Tan | 6,035,371 A | 3/2000 | Magloire |
| 5,761,484 A | 6/1998 | Agarwal et al. | 6,038,650 A | 3/2000 | Vorbach et al. |
| 5,773,994 A | 6/1998 | Jones | 6,038,656 A | 3/2000 | Cummings et al. |
| 5,778,439 A | 7/1998 | Trimberger et al. | 6,044,030 A | 3/2000 | Zheng et al. |

| | | | | | | |
|---|---|---|---|---|---|---|
| 6,047,115 | A | 4/2000 | Mohan et al. | 6,321,366 | B1 | 11/2001 | Tseng et al. |
| 6,049,222 | A | 4/2000 | Lawman | 6,321,373 | B1 | 11/2001 | Ekanadham et al. |
| 6,049,866 | A | 4/2000 | Earl | 6,338,106 | B1 | 1/2002 | Vorbach et al. |
| 6,052,773 | A | 4/2000 | DeHon et al. | 6,341,318 | B1 | 1/2002 | Dakhil |
| 6,054,873 | A | 4/2000 | Laramie | 6,347,346 | B1 | 2/2002 | Taylor |
| 6,055,619 | A | 4/2000 | North et al. | 6,349,346 | B1 | 2/2002 | Hanrahan et al. |
| 6,058,469 | A | 5/2000 | Baxter | 6,353,841 | B1 | 3/2002 | Marshall et al. |
| 6,076,157 | A | 6/2000 | Borkenhagen et al. | 6,362,650 | B1 | 3/2002 | New et al. |
| 6,077,315 | A | 6/2000 | Greenbaum et al. | 6,370,596 | B1 | 4/2002 | Dakhil |
| 6,081,903 | A | 6/2000 | Vorbach et al. | 6,373,779 | B1 | 4/2002 | Pang et al. |
| 6,084,429 | A | 7/2000 | Trimberger | 6,374,286 | B1 | 4/2002 | Gee |
| 6,085,317 | A | 7/2000 | Smith | 6,378,068 | B1 | 4/2002 | Foster et al. |
| 6,086,628 | A | 7/2000 | Dave et al. | 6,381,624 | B1 | 4/2002 | Colon-Bonet et al. |
| 6,088,795 | A | 7/2000 | Vorbach et al. | 6,389,379 | B1 | 5/2002 | Lin et al. |
| 6,092,174 | A | 7/2000 | Roussakov | 6,389,579 | B1 | 5/2002 | Phillips et al. |
| 6,105,105 | A | 8/2000 | Trimberger et al. | 6,392,912 | B1 | 5/2002 | Hanrahan et al. |
| 6,105,106 | A | 8/2000 | Manning | 6,398,383 | B1 | 6/2002 | Huang |
| 6,108,760 | A | 8/2000 | Mirsky et al. | 6,400,601 | B1 | 6/2002 | Sudo et al. |
| 6,118,724 | A | 9/2000 | Higginbottom | 6,404,224 | B1 | 6/2002 | Azegami et al. |
| 6,119,181 | A | 9/2000 | Vorbach et al. | 6,405,185 | B1 | 6/2002 | Pechanek et al. |
| 6,122,719 | A | 9/2000 | Mirsky et al. | 6,405,299 | B1 | 6/2002 | Vorbach et al. |
| 6,125,408 | A | 9/2000 | McGee et al. | 6,421,808 | B1 | 7/2002 | McGeer |
| 6,127,908 | A | 10/2000 | Bozler et al. | 6,421,809 | B1 | 7/2002 | Wuytack et al. |
| 6,128,720 | A | 10/2000 | Pechanek et al. | 6,421,817 | B1 | 7/2002 | Mohan et al. |
| 6,134,166 | A | 10/2000 | Lytle et al. | 6,425,054 | B1 | 7/2002 | Nguyen |
| 6,137,307 | A | 10/2000 | Iwanczuk et al. | 6,425,068 | B1 | 7/2002 | Vorbach et al. |
| 6,145,072 | A | 11/2000 | Shams et al. | 6,426,649 | B1 | 7/2002 | Fu et al. |
| 6,150,837 | A | 11/2000 | Beal et al. | 6,427,156 | B1 | 7/2002 | Chapman et al. |
| 6,150,839 | A | 11/2000 | New et al. | 6,430,309 | B1 | 8/2002 | Pressman et al. |
| 6,154,048 | A | 11/2000 | Iwanczuk et al. | 6,434,642 | B1 | 8/2002 | Camilleri et al. |
| 6,154,049 | A | 11/2000 | New | 6,434,672 | B1 | 8/2002 | Gaither |
| 6,157,214 | A | 12/2000 | Marshall | 6,434,695 | B1 * | 8/2002 | Esfahani et al. ................ 713/2 |
| 6,170,051 | B1 | 1/2001 | Dowling | 6,434,699 | B1 | 8/2002 | Jones et al. |
| 6,172,520 | B1 | 1/2001 | Lawman et al. | 6,435,054 | B1 | 8/2002 | Nguyen |
| 6,173,434 | B1 | 1/2001 | Wirthlin et al. | 6,437,441 | B1 | 8/2002 | Yamamoto |
| 6,178,494 | B1 | 1/2001 | Casselman | 6,438,747 | B1 | 8/2002 | Schreiber et al. |
| 6,185,256 | B1 | 2/2001 | Saito et al. | 6,457,116 | B1 | 9/2002 | Mirsky et al. |
| 6,185,731 | B1 | 2/2001 | Maeda et al. | 6,476,634 | B1 | 11/2002 | Bilski |
| 6,188,240 | B1 | 2/2001 | Nakaya | 6,477,643 | B1 | 11/2002 | Vorbach et al. |
| 6,188,650 | B1 | 2/2001 | Hamada et al. | 6,480,937 | B1 | 11/2002 | Vorbach et al. |
| 6,198,304 | B1 | 3/2001 | Sasaki | 6,480,954 | B2 | 11/2002 | Trimberger et al. |
| 6,201,406 | B1 | 3/2001 | Iwanczuk et al. | 6,483,343 | B1 | 11/2002 | Faith et al. |
| 6,202,182 | B1 | 3/2001 | Abramovici et al. | 6,487,709 | B1 | 11/2002 | Keller et al. |
| 6,202,627 | B1 | 3/2001 | Abramovici et al. | 6,490,695 | B1 | 12/2002 | Zagorski et al. |
| 6,204,687 | B1 | 3/2001 | Schultz et al. | 6,496,971 | B1 | 12/2002 | Lesea et al. |
| 6,211,697 | B1 | 4/2001 | Lien et al. | 6,507,898 | B1 | 1/2003 | Gibson et al. |
| 6,212,650 | B1 | 4/2001 | Guccione | 6,507,947 | B1 | 1/2003 | Schreiber et al. |
| 6,215,326 | B1 | 4/2001 | Jefferson et al. | 6,512,804 | B1 | 1/2003 | Johnson et al. |
| 6,216,223 | B1 | 4/2001 | Revilla et al. | 6,513,077 | B2 | 1/2003 | Vorbach et al. |
| 6,219,833 | B1 | 4/2001 | Solomon et al. | 6,516,382 | B2 | 2/2003 | Manning |
| RE37,195 | E | 5/2001 | Kean | 6,518,787 | B1 | 2/2003 | Allegrucci et al. |
| 6,230,307 | B1 | 5/2001 | Davis et al. | 6,519,674 | B1 | 2/2003 | Lam et al. |
| 6,240,502 | B1 | 5/2001 | Panwar et al. | 6,523,107 | B1 | 2/2003 | Stansfield et al. |
| 6,243,808 | B1 | 6/2001 | Wang | 6,525,678 | B1 | 2/2003 | Veenstra et al. |
| 6,247,147 | B1 | 6/2001 | Beenstra et al. | 6,526,520 | B1 | 2/2003 | Vorbach et al. |
| 6,252,792 | B1 | 6/2001 | Marshall et al. | 6,697,979 | B1 | 2/2003 | Vorbach et al. |
| 6,256,724 | B1 | 7/2001 | Hocevar et al. | 6,538,468 | B1 | 3/2003 | Moore |
| 6,260,179 | B1 | 7/2001 | Ohsawa et al. | 6,538,470 | B1 | 3/2003 | Langhammer et al. |
| 6,262,908 | B1 | 7/2001 | Marshall et al. | 6,539,415 | B1 | 3/2003 | Mercs |
| 6,263,430 | B1 | 7/2001 | Trimberger et al. | 6,539,438 | B1 | 3/2003 | Ledzius et al. |
| 6,266,760 | B1 | 7/2001 | DeHon et al. | 6,539,477 | B1 | 3/2003 | Seawright |
| 6,279,077 | B1 | 8/2001 | Nasserbakht et al. | 6,542,394 | B2 | 4/2003 | Marshall et al. |
| 6,282,627 | B1 | 8/2001 | Wong et al. | 6,542,844 | B1 * | 4/2003 | Hanna ....................... 702/120 |
| 6,282,701 | B1 | 8/2001 | Wygodny et al. | 6,542,998 | B1 | 4/2003 | Vorbach et al. |
| 6,285,624 | B1 | 9/2001 | Chen | 6,553,395 | B2 | 4/2003 | Marshall et al. |
| 6,286,134 | B1 | 9/2001 | Click, Jr. et al. | 6,553,479 | B2 | 4/2003 | Mirsky et al. |
| 6,288,566 | B1 | 9/2001 | Hanrahan et al. | 6,567,834 | B1 | 5/2003 | Marshall et al. |
| 6,289,440 | B1 | 9/2001 | Casselman | 6,571,381 | B1 | 5/2003 | Vorbach et al. |
| 6,298,396 | B1 | 10/2001 | Loyer et al. | 6,587,939 | B1 | 7/2003 | Takano |
| 6,298,472 | B1 | 10/2001 | Phillips et al. | 6,598,128 | B1 | 7/2003 | Yoshioka |
| 6,301,706 | B1 | 10/2001 | Maslennikov et al. | 6,606,704 | B1 | 8/2003 | Adiletta et al. |
| 6,311,200 | B1 | 10/2001 | Hanrahan et al. | 6,631,487 | B1 | 10/2003 | Abramovici et al. |
| 6,311,265 | B1 | 10/2001 | Beckerle et al. | 6,633,181 | B1 | 10/2003 | Rupp |

| | | |
|---|---|---|
| 6,657,457 B1 | 12/2003 | Hanrahan et al. |
| 6,658,564 B1 | 12/2003 | Smith et al. |
| 6,665,758 B1 | 12/2003 | Frazier et al. |
| 6,687,788 B2 | 2/2004 | Vorbach et al. |
| 6,704,816 B1 | 3/2004 | Burke |
| 6,708,325 B2 | 3/2004 | Cooke et al. |
| 6,504,398 B1 | 4/2004 | Vorbach |
| 6,717,436 B2 | 4/2004 | Kress et al. |
| 6,721,830 B2 | 4/2004 | Vorbach et al. |
| 6,728,871 B1 | 4/2004 | Vorbach et al. |
| 6,745,317 B1 | 6/2004 | Mirsky et al. |
| 6,748,440 B1 | 6/2004 | Lisitsa et al. |
| 6,751,722 B2 | 6/2004 | Mirsky et al. |
| 6,754,805 B1 | 6/2004 | Yujen |
| 6,757,847 B1 * | 6/2004 | Farkash et al. ............. 714/39 |
| 6,757,892 B1 | 6/2004 | Gokhale et al. |
| 6,782,445 B1 | 8/2004 | Olgiati et al. |
| 6,785,826 B1 | 8/2004 | Durham et al. |
| 6,802,026 B1 | 10/2004 | Patterson et al. |
| 6,802,206 B2 | 10/2004 | Patterson et al. |
| 6,803,787 B1 | 10/2004 | Wicker, Jr. |
| 6,820,188 B2 | 11/2004 | Stansfield et al. |
| 6,829,697 B1 | 12/2004 | Davis et al. |
| 6,847,370 B2 | 1/2005 | Baldwin et al. |
| 6,868,476 B2 | 3/2005 | Rosenbluth et al. |
| 6,871,341 B1 | 3/2005 | Shyr |
| 6,874,108 B1 | 3/2005 | Abramovici et al. |
| 6,886,092 B1 | 4/2005 | Douglass et al. |
| 6,901,502 B2 | 5/2005 | Yano et al. |
| 6,928,523 B2 | 8/2005 | Yamada |
| 6,961,924 B2 | 11/2005 | Bates et al. |
| 6,975,138 B2 | 12/2005 | Pani et al. |
| 6,977,649 B1 | 12/2005 | Baldwin et al. |
| 7,000,161 B1 | 2/2006 | Allen et al. |
| 7,007,096 B1 | 2/2006 | Lisitsa et al. |
| 7,010,687 B2 | 3/2006 | Ichimura |
| 7,028,107 B2 | 4/2006 | Vorbach et al. |
| 7,038,952 B1 | 5/2006 | Zack et al. |
| 7,043,416 B1 | 5/2006 | Lin |
| 7,210,129 B2 | 4/2007 | May et al. |
| 7,216,204 B2 | 5/2007 | Rosenbluth et al. |
| 7,237,087 B2 | 6/2007 | Vorbach et al. |
| 7,249,351 B1 | 7/2007 | Songer et al. |
| 7,254,649 B2 | 8/2007 | Subramanian et al. |
| 7,340,596 B1 | 3/2008 | Crosland et al. |
| 7,346,644 B1 | 3/2008 | Langhammer et al. |
| 7,350,178 B1 | 3/2008 | Crosland et al. |
| 7,382,156 B2 | 6/2008 | Pani et al. |
| 7,595,659 B2 | 9/2009 | Vorbach et al. |
| 7,650,448 B2 | 1/2010 | Vorbach et al. |
| 2001/0001860 A1 | 5/2001 | Bieu |
| 2001/0003834 A1 | 6/2001 | Shimonishi |
| 2001/0010074 A1 | 7/2001 | Nishihara et al. |
| 2001/0018733 A1 | 8/2001 | Fujii et al. |
| 2001/0032305 A1 | 10/2001 | Barry |
| 2002/0013861 A1 | 1/2002 | Adiletta et al. |
| 2002/0038414 A1 | 3/2002 | Taylor et al. |
| 2002/0045952 A1 | 4/2002 | Blemel |
| 2002/0083308 A1 | 6/2002 | Pereira et al. |
| 2002/0103839 A1 | 8/2002 | Ozawa |
| 2002/0124238 A1 | 9/2002 | Metzgen |
| 2002/0138716 A1 | 9/2002 | Paul et al. |
| 2002/0143505 A1 | 10/2002 | Drusinsky |
| 2002/0144229 A1 | 10/2002 | Hanrahan |
| 2002/0156962 A1 | 10/2002 | Chopra et al. |
| 2002/0165886 A1 | 11/2002 | Lam |
| 2003/0001615 A1 | 1/2003 | Sueyoshi et al. |
| 2003/0014743 A1 | 1/2003 | Cooke et al. |
| 2003/0046607 A1 | 3/2003 | Vorbach |
| 2003/0052711 A1 | 3/2003 | Taylor et al. |
| 2003/0055861 A1 | 3/2003 | Lai et al. |
| 2003/0056085 A1 | 3/2003 | Vorbach |
| 2003/0056091 A1 | 3/2003 | Greenberg |
| 2003/0056202 A1 | 3/2003 | Vorbach |
| 2003/0061542 A1 | 3/2003 | Bates et al. |
| 2003/0062922 A1 | 4/2003 | Douglass et al. |
| 2003/0086300 A1 | 5/2003 | Noyes et al. |
| 2003/0093662 A1 | 5/2003 | Vorbach et al. |
| 2003/0097513 A1 | 5/2003 | Vorbach et al. |
| 2003/0123579 A1 | 7/2003 | Safavi et al. |
| 2003/0135686 A1 | 7/2003 | Vorbach et al. |
| 2003/0192032 A1 * | 10/2003 | Andrade et al. ............. 717/124 |
| 2004/0015899 A1 | 1/2004 | May et al. |
| 2004/0025005 A1 | 2/2004 | Vorbach et al. |
| 2004/0039880 A1 | 2/2004 | Pentkovski et al. |
| 2004/0078548 A1 | 4/2004 | Claydon et al. |
| 2004/0168099 A1 | 8/2004 | Vorbach et al. |
| 2004/0199688 A1 | 10/2004 | Vorbach et al. |
| 2005/0066213 A1 | 3/2005 | Vorbach et al. |
| 2005/0144210 A1 | 6/2005 | Simkins et al. |
| 2005/0144212 A1 | 6/2005 | Simkins et al. |
| 2005/0144215 A1 | 6/2005 | Simkins et al. |
| 2006/0230094 A1 | 10/2006 | Simkins et al. |
| 2006/0230096 A1 | 10/2006 | Thendean et al. |
| 2009/0085603 A1 | 4/2009 | Paul et al. |

FOREIGN PATENT DOCUMENTS

| | | |
|---|---|---|
| DE | 44 16 881 | 11/1994 |
| DE | 38 55 673 | 11/1996 |
| DE | 196 51 075 | 6/1998 |
| DE | 196 54 593 | 7/1998 |
| DE | 196 54 595 | 7/1998 |
| DE | 196 54 846 | 7/1998 |
| DE | 197 04 044 | 8/1998 |
| DE | 197 04 728 | 8/1998 |
| DE | 197 04 742 | 9/1998 |
| DE | 198 22 776 | 3/1999 |
| DE | 198 07 872 | 8/1999 |
| DE | 198 61 088 | 2/2000 |
| DE | 199 26 538 | 12/2000 |
| DE | 100 28 397 | 12/2001 |
| DE | 100 36 627 | 2/2002 |
| DE | 101 29 237 | 4/2002 |
| DE | 102 04 044 | 8/2003 |
| EP | 0 208 457 | 1/1987 |
| EP | 0 221 360 | 5/1987 |
| EP | 0 398 552 | 11/1990 |
| EP | 0 428 327 | 5/1991 |
| EP | 0 463 721 | 1/1992 |
| EP | 0 477 809 | 4/1992 |
| EP | 0 485 690 | 5/1992 |
| EP | 0 427 429 | 8/1992 |
| EP | 0 497 029 | 8/1992 |
| EP | 0 539 595 | 5/1993 |
| EP | 0 638 867 A2 | 8/1994 |
| EP | 0 628 917 | 12/1994 |
| EP | 0 678 985 | 10/1995 |
| EP | 0 686 915 | 12/1995 |
| EP | 0 707 269 | 4/1996 |
| EP | 0 735 685 | 10/1996 |
| EP | 0 835 685 | 10/1996 |
| EP | 0 746 106 | 12/1996 |
| EP | 0 748 051 | 12/1996 |
| EP | 0 726 532 | 7/1998 |
| EP | 0 926 594 | 6/1999 |
| EP | 1 102 674 | 7/1999 |
| EP | 1 061 439 | 12/2000 |
| EP | 1 115 204 | 7/2001 |
| EP | 1 146 432 | 10/2001 |
| EP | 0 696 001 | 12/2001 |
| EP | 1 669 885 | 6/2006 |
| FR | 2 752 466 | 2/1998 |
| GB | 2 304 438 | 3/1997 |
| JP | 58-58672 | 4/1983 |
| JP | 01-229378 | 9/1989 |

| | | |
|---|---|---|
| JP | 2-130023 | 5/1990 |
| JP | 2-226423 | 9/1990 |
| JP | 5-265705 | 10/1993 |
| JP | 5-276007 | 10/1993 |
| JP | 6-266605 | 9/1994 |
| JP | 07-086921 | 3/1995 |
| JP | 7-154242 | 6/1995 |
| JP | 8-148989 | 6/1995 |
| JP | 8-44581 | 2/1996 |
| JP | 08069447 | 3/1996 |
| JP | 08-101761 | 4/1996 |
| JP | 8-102492 | 4/1996 |
| JP | 8-221164 | 8/1996 |
| JP | 8-250685 | 9/1996 |
| JP | 9-27745 | 1/1997 |
| JP | 09-294069 | 11/1997 |
| JP | 11-184718 | 7/1999 |
| JP | 11-307725 | 11/1999 |
| JP | 2000-076066 | 3/2000 |
| JP | 2000-181566 | 6/2000 |
| JP | 2000-201066 | 7/2000 |
| JP | 2000-311156 | 11/2000 |
| JP | 2001-500682 | 1/2001 |
| JP | 2001-167066 | 6/2001 |
| JP | 2001-510650 | 7/2001 |
| JP | 2002-0033457 | 1/2002 |
| JP | 05-509184 | 12/2003 |
| JP | 3-961028 | 8/2007 |
| WO | WO90/04835 | 5/1990 |
| WO | WO90/11648 | 10/1990 |
| WO | WO92/01987 | 2/1992 |
| WO | WO93/11503 | 6/1993 |
| WO | WO94/06077 | 3/1994 |
| WO | WO94/08399 | 4/1994 |
| WO | WO95/00161 | 1/1995 |
| WO | WO95/26001 | 9/1995 |
| WO | WO98/10517 | 3/1998 |
| WO | WO98/26356 | 6/1998 |
| WO | WO98/28697 | 7/1998 |
| WO | WO98/29952 | 7/1998 |
| WO | WO98/31102 | 7/1998 |
| WO | WO98/35294 | 8/1998 |
| WO | WO98/35299 | 8/1998 |
| WO | WO99/00731 | 1/1999 |
| WO | WO99/00739 | 1/1999 |
| WO | WO 99/12111 | 3/1999 |
| WO | WO99/32975 | 7/1999 |
| WO | WO99/40522 | 8/1999 |
| WO | WO99/44120 | 9/1999 |
| WO | WO99/44147 | 9/1999 |
| WO | WO00/17771 | 3/2000 |
| WO | WO00/38087 | 6/2000 |
| WO | 00/45282 | 8/2000 |
| WO | WO00/49496 | 8/2000 |
| WO | WO00/77652 | 12/2000 |
| WO | WO01/55917 | 8/2001 |
| WO | WO02/13000 | 2/2002 |
| WO | WO02/21010 | 3/2002 |
| WO | WO02/29600 | 4/2002 |
| WO | WO02/50665 | 6/2002 |
| WO | WO02/071196 | 9/2002 |
| WO | WO02/071248 | 9/2002 |
| WO | WO02/071249 | 9/2002 |
| WO | WO02/103532 | 12/2002 |
| WO | WO03/017095 | 2/2003 |
| WO | WO03/023616 | 3/2003 |
| WO | WO03/025781 | 3/2003 |
| WO | WO03/032975 | 4/2003 |
| WO | WO03/036507 | 5/2003 |
| WO | WO 03/091875 | 11/2003 |
| WO | WO2004/053718 | 6/2004 |
| WO | WO2004/114128 | 12/2004 |
| WO | WO2005/045692 | 5/2005 |

OTHER PUBLICATIONS

Callahan, et al., "The Garp Architecture and C Compiler," Computer, Apr. 2000, pp. 62-69.

Cardoso, Joao M.P. and Markus Weinhardt, "XPP-VC: A C Compiler with Temporal Partitioning for the PACT-XPP Architecture," Field-Programmable Logic and Applications. Reconfigurable Computing is Going Mainstream, 12$^{th}$ International Conference FPL 2002, Proceedings (Lecture Notes in Computer Science, vol. 2438) Springer-Verlag Berlin, Germany, 2002, pp. 864-874.

Chen et al., "A reconfigurable multiprocessor IC for rapid prototyping of algorithmic-specific high-speed DSP data paths," IEEE Journal of Solid-State Circuits, vol. 27, No. 12, Dec. 1992, pp. 1895-1904.

DeHon, A., "DPGA Utilization and Application," MIT Artificial Intelligence Laboratory, Proceedings of the Fourth International ACM Symposium on Field-Programmable Gate Arrays (FPGA '96), IEEE Computer Society, pp. 1-7.

Fornaciari, et al., System-level power evaluation metrics, 1997 Proceedings of the 2$^{nd}$ Annual IEEE International Conference on Innovative Systems in Silicon, New York, NY, Oct. 1997, pp. 323-330.

Franklin, Majoj et al., "A Fill-Unit Approach to Multiple Instruction Issue," Proceedings of the Annual International Symposium on Microarchitecture, Nov. 1994, pp. 162-171.

Hartenstein, R., "Coarse grain reconfigurable architectures," Design Automation Conference, 2001, Proceedings of the ASP-DAC 2001 Asia and South Pacific, Jan. 30-Feb. 2, 2001, IEEE Jan. 30, 2001, pp. 564-569.

Hastie et al., "The implementation of hardware subroutines on field programmable gate arrays," Custom Integrated Circuits Conference, 1990, Proceedings of the IEEE 1990, May 16, 1990, pp. 31.3.1-31. 4.3 (3 pages).

Kastrup, B., "Automatic Hardware Synthesis for a Hybrid Reconfigurable CPU Featuring Philips CPLDs," Proceedings of the PACT Workshop on Reconfigurable Computing, 1998, pp. 5-10.

Koren et al., "A data-driven VLSI array for arbitrary algorithms," IEEE Computer Society, Long Beach, CA vol. 21, No. 10, Oct. 1, 1988, pp. 30-34.

Lee, Jong-eun et al., "Reconfigurable ALU Array Architecture with Conditional Execution," International Soc. Design Conference (ISOOC) [online] Oct. 25, 2004, Seoul, Korea, 5 pages.

Ozawa, Motokazu et al., "A Cascade ALU Architecture for Asynchronous Super-Scalar Processors," IEICE Transactions on Electronics, Electronics Society, Tokyo, Japan, vol. E84-C, No. 2, Feb. 2001, pp. 229-237.

Piotrowski, A., "IEC-BUS, Die Funktionsweise des IEC-BUS unde seine Anwendung in Geräten and Systemen," 1987, Franzis-Verlag GmbH, München, pp. 20-25.

Razdan et al., A High-Performance Microarchitecture with Hardware-Programmable Functional Units, Micro-27, Proceedings of the 27$^{th}$ Annual International Symposium on Microarchitecture, IEEE Computer Society and Association for Computing Machinery, Nov. 30-Dec. 2, 1994, pp. 172-180.

Schmit, et al., Hidden Markov Modeling and Fuzzy Controllers in FPGAs, FPGAs for Custom Computing machines, 1995; Proceedings, IEEE Symposium in Napa Valley, CA, Apr. 1995, pp. 214-221.

Siemers et al., "The .>S<puter: A Novel Micoarchitecture Mode for Execution inside Superscalar and VLIW Processors Using Reconfigurable Hardware," Australian Computer Science Communications, vol. 20, No. 4, Computer Architecture, Proceedings of the 3$^{rd}$ Australian Computer Architecture Conference, Perth, John Morris, Ed., Feb. 2-3, 1998, pp. 169-178.

Simunic, et al., Source Code Optimization and Profiling of Energy Consumation in Embedded Systems, Proceedings of the 13$^{th}$ International Symposium on System Synthesis, Sep. 2000, pp. 193-198.

Skokan, Z.E., "Programmable logic machine (A programmable cell array)," IEEE Journal of Solid-State Circuits, vol. 18, Issue 5, Oct. 1983, pp. 572-578.

The XPP White Paper, Release 2.1, PACT—A Technical Perspective, Mar. 27, 2002, pp. 1-27.

Villasenor, et al., "Express Letters Video Communications Using Rapidly Reconfigurable Hardware," IEEE Transactions on Circuits and Systems for Video Technology, IEEE, Inc., NY, Dec. 1995, pp. 565-567.

Weinhardt, M., "Compilation Methods for Structure-programmable Computers," dissertation, ISBN 3-89722-011-3, 1997. [Table of Contents and English Abstract Provided].

Weinhardt, Markus et al., "Pipeline Vectorization," IEEE Transactions on Computer-Aided Design of Integrated Circuits and Systems, vol. 20, No. 2, Feb. 2001, pp. 234-248.

XILINX, "Logic Cell Array Families: XC4000, XC4000A and XC4000H," product description, pp. 2-7, 2-9, 2-14, 2-15, 8-16, and 9-14.

Yeung, A. et al., "A data-driven architecture for rapid prototyping of high throughput DSP algorithms," Dept. of Electrical Engineering and Computer Sciences, Univ. of California, Berkeley, USA, *Proceedings VLSI Signal Processing Workshop, IEEE Press*, pp. 225-234, Napa, Oct. 1992.

Ohmsha, "Information Processing Handbook," edited by the Information Processing Society of Japan, pp. 376, Dec. 21, 1998.

Asari, et al., "FeRAM circuit technology for system on a chip," *Proceedings First NASA/DoD Workshop on Evolvable Hardware*, pp. 193-197 (1999).

Lee, et al., "Multimedia extensions for general-purpose processors," *IEEE Workshop on Signal Processing Systems, SIPS 97—Design and Implementation*, pp. 9-23 (1997).

Pirsch, et al., "VLSI implementations of image and video multimedia processing systems," *IEEE Transactions on Circuits and Systems for Video Technology* 8(7): 878-891 (Nov. 1998).

Salefski, et al., "Re-configurable computing in wireless," *Annual ACM IEEE Design Automation Conference: Proceedings of the 38$^{th}$ conference on Design automation*, pp. 178-183 (2001).

Schmidt, et al., "Datawave: A Single-Chip Multiprocessor for Video Applications," *IEEE Micro* 11(3): 22-25 and 88-94 (Jun. 1991).

Ade et al., "Minimum Memory Buffers in DSP Applications," Electronics Letters, vol. 30, No. 6, Mar. 17, 1994, pp. 469-471.

Alippi, C., et al., Determining the Optimum Extended Instruction Set Architecture for Application Specific Reconfigurable VLIW CPUs, IEEE., 2001, pp. 50-56.

Arabi et al., "PLD Integrates Dedicated High-speed Data Buffering, Complex State Machine, and Fast Decode Array," conference record on WESCON '93, Sep. 28, 1993, pp. 432-436.

Athanas, Peter "A Functional Reconfigurable Architecture and Compiler for Adaptive Computing," IEEE. 1993, pp. 49-55.

Athanas, Peter et al., "An Adaptive Hardware Machine Architecture and Compiler for Dynamic Processor Reconfiguration", IEEE, Laboratory for Engineering Man/Machine Systems Division of Engineering, Box D, Brown University Providence, Rhode Island, 1991, pp. 397-400.

Athanas, Peter et al., "Quantitative analysis of floating point arithmetic on FPGA based custom computing machines", IEEE Symposium on FPGAs For Custom Computing Machines, *IEEE Computer Society Press*, Apr. 19-21, 1995, pp. i-vii, 1-222.

Baumgarte, V., et al., PACT XPP "A Self-reconfigurable Data Processing Architecture," PACT Info. GMBH, Munchen Germany 2001, 7 pages.

Beck et al., "From control flow to data flow," TR 89-1050, Oct. 1989, Dept. of Computer Science, Cornell University, Ithaca, NY, pp. 1-25.

Becker, J. et al., "Parallelization in Co-compilation for Configurable Accelerators—a Host/accelerator Partitioning Compilation Method," proceedings of Asia and South Pacific Design Automation Conference, Yokohama, Japan, Feb. 10-13, 1998, 11 pages.

Bittner, Ray A. Jr., "Wormhole Run-time Reconfiguration: Conceptualization and VLSI Design of a High Performance Computing System," *Dissertation*, Jan. 23, 1997, pp. I-XX, 1-415.

Cadambi et al., "Managing Pipeline-reconfigurable FPGAs," ACM, 1998, pp. 55-64.

Cardoso, J.M.P., "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (Table of Contents and English Abstract only).

Diniz, Pedro et al., "Automatic Synthesis of Data Storage and Control Structures for FPGA-based Computing Engines", 2000, IEEE, pp. 91-100.

Donandt, Jorg, "Improving Response Time of Programmable Logic Controllers by Use of a Boolean Coprocessor", AEG Research Institute Berlin, IEEE, 1989, pp. 4-167-4-169.

Dutt, Nikil et al., If Software is King for Systems-on-Silicon, What's New in Compiler?, IEEE., 1997, pp. 322-325.

Ferrante J. et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.

Fineberg, Samuel et al., "Experimental Analysis of a Mixed-Mode Parallel Architecture Using Bitonic Sequence Sorting", vol. 11. No. 3, Mar. 1991, pp. 239-251.

Forstner, Peter "Wer Zuerst Kommt, Mahlt Zuerst!: Teil 3: Einsatzgebiete und Anwendungsbeispiele von FIFO-Speichern", Elektronik, Aug. 2000, pp. 104-109.

Gokhale, M. B. et al., "Automatic Allocation of Arrays to Memories in FPGA processors with Multiple Memory Banks", Field-Programmable Custom Computing Machines, 1999, IEEE, pp. 63-67.

Hammes, Jeff et al., "Cameron: High Level Language Compilation for Reconfigurable Systems," Department of Computer Science, Colorado State University, Conference on Parallel Architectures and Compilation Techniques, Oct. 12-16, 1999, 9 pages.

Hauck "The Roles of FPGA's in Reprogrammable Systems," IEEE, Apr. 1998, pp. 615-638.

Hauser, John R.. et al., "Garp: A MIPS Processor with a Reconfigurable Coprocessor", University of California, Berkeley, IEEE, 1997, pp. 24-33.

Hedge, S.J., 3D WASP Devices for On-line Signal and Data Processing, 1994, International Conference on Wafer Scale Integration, pp. 11-21.

Hwang L. et al., "Min-cut Replication in Partitioned Networks" IEEE Transactions on Computer-Aided Design of Intergrated Circuits and Systems, [online]Bd. 14, Nr. 1, Jan. 1995, pp. 96-106, XP00053228 USA ISSN: 0278-0070 IEEE Xplore.

Iseli, C., et al. "A C++ Compiler for FPGA Custom Execution Units Synthesis," IEEE. 1995, pp. 173-179.

Isshiki, Tsuyoshi et al., "Bit-Serial Pipeline Synthesis for Multi-FPGA Systems with C++ Design Capture," 1996 IEEE, pp. 38-47.

Jacob, Jeffrey et al., "Memory Interfacing and Instruction Specification for Reconfigurable Processors", ACM 1999, pp. 145-154.

Jantsch, Axel et al., "A Case Study on Hardware/software Partitioning," Royal Institute of Technology, Kista, Sweden, Apr. 10, 1994 IEEE, pp. 111-118.

John, L. et al., "A Dynamically Reconfigurable Interconnect for Array Processors", vol. 6, No. 1, Mar. 1998, IEEE, pp. 150-157.

Koch, Andreas et al, "Practical Experiences with the SPARXXIL Co-Processor", 1998, IEEE, pp. 394-398.

Kung, "Deadlock Avoidance for Systolic Communication", 1988 Conference Proceedings of 15$^{th}$ Annual International Symposium on Computer Architecture, May 30, 1988, pp. 252-260.

Ling, X., "WASMII: An MPLD with Data-Driven Control on a Virtual Hardware," Journal of Supercomputing, Kluwer Academic Publishers, Dordrecht, Netherlands, 1995, pp. 253-276.

Ling et al., "WASMII: A Multifunction Programmable Logic Device (MPLD) with Data Driven Control," The Transactions of the Institute of Electronics, Information and Communication Engineers, Apr. 25, 1994, vol. J77-D-1, Nr. 4, pp. 309-317. [This references is in Chinese, but should be comparable in content to the Ling et al. reference above].

Maxfield, C. "Logic that Mutates While-U-Wait" EDN (Bur. Ed) (USA), EDN (European Edition), Nov. 7, 1996, Cahners Publishing, USA, pp. 137-140, 142.

Myers, G. "Advances in Computer Architecture," Wiley-Interscience Publication, 2nd ed., John Wiley & Sons, Inc. , 1978, pp. 463-494.

Miller, Michael J. et al., "High-Speed FIFOs Contend with Widely Differing Data Rates: Dual-port RAM Buffer and Dual-pointer System Provide Rapid, High-density Data Storage and Reduce Overhead", Computer Design, Sep. 1, 1985, pp. 83-86.

Mirsky, E. et a., "MATRIX: A Reconfigurable Computing Architecture with Configurable Instruction Distribution and Deployable Resources," Proceedings of the IEEE Symposium on FPGAs for Custom Computing Machines, 1996, pp. 157-166.

Morris Mano, "Digital Design," by Prentice Hall, Inc., Englewood Cliffs, New Jersey 07632, 1984, pp. 119-125, 154-161.

Myers, G. "Advances in Computer Architecture," Wiley-Interscience Publication, 2nd ed., John Wiley & Sons, Inc. pp. 463-494, 1978.

Nilsson et al., "The Scalable Tree Protocol-A Cache Coherence Approaches for Large-Scale Multiprocessors" IEEE, pp. 498-506 Dec. 1992.

Norman, Richard S., "Hyperchip Business Summary, The Opportunity," Jan. 31, 2000, pp. 1-3.

Saleeba, M., "A Self-Contained Dynamically Reconfigurable Processor Architecture," Sixteenth Australian Computer Science Conference, ASCS-16, QLD, Australia, Feb. 1993.

Shirazi, et al., "Quantitative analysis of floating point arithmetic on FPGA based custom computing machines," IEEE Symposium on FPGAs for Custom Computing Machines, *IEEE Computer Society Press*, Apr. 19-21, 1995, pp. 155-162.

Siemers, Christian, "Rechenfabrik Ansaetze Fuer Extrem Parallele Prozessoren", Verlag Heinze Heise GmbH., Hannover, DE No. 15, Jul. 16, 2001, pp. 170-179.

Sueyoshi, T, "Present Status and Problems of the Reconfigurable Computing Systems Toward the Computer Evolution," Department of Artificial Intelligence, Kyushi Institute of Technology, Fukuoka, Japan; Institute of Electronics, Information and Communication Engineers, vol. 96, No. 426, IEICE Technical Report (1996), pp. 111-119 [English Abstract Only].

Tau, Edward et al., "A First Generation DPGA Implementation," *FPD '95*, pp. 138-143.

Tenca, Alexandre F., et al., "A Variable Long-Precision Arithmetic Unit Design for Reconfigurable Coprocessor Architectures", University of California, Los Angeles, 1998, pp. 216-225.

TMS320C54X DSP: CPU and Peripherals, Texas Instruments, 1996, pp. 6-26 to 6-46.

TMS320C54x DSP: Mnemonic Instruction Set, Texas Instruments, 1996, p. 4-64.

Villasensor, J. et al., "Express Letters Video Communications Using Rapidly Reconfigurable Hardware," Transactions on Circuits and Systems for Video Technology, IEEE, Inc. NY, Dec. 1995, pp. 565-567.

Villasenor, John et al., "Configurable Computing Solutions for Automatic Target Recognition," *IEEE*, 1996 pp. 70-79.

Villasenor, John et al., "Configurable Computing," *Scientific American*, vol. 276, No. 6, Jun. 1997, pp. 66-71.

Wada, K. et al., "A Performance Evaluation of Tree-based Coherent Distributed Shared Memory" Proceedings of the Pacific RIM Conference on Communications, Comput and Signal Processing, Victoria, May 19-21, 1993, pp. 390-393.

Weinhardt, Markus et al., "Pipeline Vectorization," IEEE Transactions on Computer-Aided Design of Integrated Circuits and Systems, vol. 20, No. 2, Feb. 2001, pp. 234-248.

Weinhardt, M. "Compilation Methods for Structure-programmable Computers", dissertation, ISBN 3-89722-011-3, 1997.

Weinhardt, Marcus et al., "Pipeline Vectorization for Reconfigurable Systems", 1999, IEEE, pp. 52-60.

Weinhardt, Markus, "Ubersetzingsmethoden fur strukturprogrammierbare rechner ," Dissertation for Doktors der Ingenieurwissenschaften der Universitat Karlsruhe: Jul. 1, 1997.

Wittig et al., "OneChip: An FPGA Processor with Reconfigurable Logic" IEEE, 1996 pp. 126-135.

Wu et al., "A New Cache Directory Scheme", IEEE, pp. 466-472, Jun. 1996.

Xu, Hong Yu et al., "Parallel QR Factorization on a Block Data Flow Architecture" Conference Proceeding Article, Mar. 1, 1992, pp. 332-336 XPO10255276, p. 333, Abstract 2.2, 2.3, 2.4-p. 334.

Ye, Z.A. et al., "A C Compiler for a Processor with a Reconfigurable Functional Unit," FPGA 2000 ACM/SIGNA International Symposium on Field Programmable Gate Arrays, Monterey, CA Feb. 9-11, 2000, pp. 95-100.

Newly Cited Reference: Yeung et al., "A reconfigurable data-driven multiprocessor architecture for rapid protyping of high throughput DSP algorithms," Dept. of Electrical Engineering and Computer Sciences, Univ. of Berkeley, California, 1993, pp. 169-178.

U.S. Appl. No. 60/109,417, filed Nov. 18, 1998, Jefferson et al.

Advanced RISC Machines, "Introduction to AMBA," Section 1, pp. 1-1 to 1-7 (Oct. 1996).

ARM, "The Architecture for the Digital World," http://www.arm.com/products, 3 pages (Mar. 18, 2009).

ARM, "The Architecture for the Digital World; Milestones," http://www.arm.com/aboutarm/milestones.html, 5 pages (Mar. 18, 2009).

Del Corso, et al., "Microcomputer Buses and Links," Academic Press Inc. Ltd., pp. 138-143, 277-285 (1986).

"IEEE Standard Test Access Port and Boundary-Scan Architecture," IEEE Std. 1149.1-1990, pp. 1-127 (1993).

PCI Local Bus Specification, Production Version, Revision 2.1, Portland, OR, pp. 1-281 (Jun. 1, 1995).

"The Programmable Logic Data Book," XILINX, Inc., Section 2, pp. 1-240, Section 8, pp. 1, 23-25, 29, 45-52, 169-172 (1994).

Altera, "APEX 20K Programmable Logic Device Family," Altera Corporation Data Sheet, Mar. 2004, ver. 5.1, pp. 1-117.

IMEC, "ADRES multimedia processor & 3MF multimedia platform," Transferable IP, IMEC Technology Description, (Applicants believe the date to be Oct. 2005), 3 pages.

Kanter, David, "NVIDIA's GT200: Inside a Parallel Processor," http://www.realworldtech.com/page.cfm?ArticleID=RWT090989195242&p=1, Sep. 8, 2008, 27 pages.

XILINX, "Virtex-E 1.8 V Extended Memory Field Programmable Gate Arrays," (v2.2) Sep. 10, 2002, Xilinx Production Product Specification, pp. 1-52.

XILINX, "Virtex-II and Virtex-II Pro X FPGA Platform FPGAs: Complete Data Sheet," (v4.6) Mar. 5, 2007, pp. 1-302.

XILINX, "Virtex-II Platform FPGAs: Complete Data Sheet," (v3.5) Nov. 5, 2007, pp. 1-226.

Agarwal, A., et al., "APRIL: A Processor Architecture for Multiprocessing," Laboratory for Computer Science, MIT, Cambridge, MA, IEEE 1990, pp. 104-114.

Almasi and Gottlieb, *Highly Parallel Computing*, The Benjamin/Cummings Publishing Company, Inc., Redwood City, CA, 1989, 3 pages (Fig. 4.1).

Advanced RISC Machines Ltd (ARM), "AMBA—Advanced Microcontroller Bus Architecture Specification," (Document No. ARM IHI 0001C), Sep. 1995, 72 pages.

Alfke, Peter; New, Bernie, *Xilinx Application Note*, "Additional XC3000 Data," XAPP 024.000, 1994, pp. 8-11 through 8-20.

Alfke, Peter; New, Bernie, *Xilinx Application Note*, "Adders, Subtracters and Accumulators in XC3000," XAPP 022.000, 1994, pp. 8-98 through 8-104.

Alfke, Peter, *Xilinx Application Note*, "Megabit FIFO in Two Chips: One LCA Device and One DRAM," XAPP 030.000, 1994, pp. 8-148 through 8-150.

Alfke, Peter, *Xilinx Application Note*, "Dynamic Reconfiguration," XAPP 093, Nov. 10, 1997, pp. 13-45 through 13-46.

Alfke, Peter; New, Bernie, *Xilinx Application Note*, "Implementing State Machines in LCA Devices", XAPP 027.001, 1994, pp. 8-169 through 8-172.

Algotronix, Ltd., CAL64K Preliminary Data Sheet, Apr. 1989, pp. 1-24.

Algotronix, Ltd., CAL4096 Datasheet, 1992, pp. 1-53.

Algotronix, Ltd., CHS2x4 User Manual, "CHA2x4 Custom Computer," 1991, pp. 1-38.

Allaire, Bill; Fischer, Bud, *Xilinx Application Note*, "Block Adaptive Filter," XAPP 055, Aug. 15, 1996 (Version 1.0), pp. 1-10.

Altera Application Note (73), "Implementing FIR Filters in FLEX Devices," Altera Corporation, Feb. 1998, ver. 1.01, pp. 1-23.

Athanas, P. (Thesis), "An adaptive machine architecture and compiler for dynamic processor reconfiguration," Brown University 1992, pp. 1-157.

Berkeley Design Technology, Inc., Buyer's Guide to DSP Processors 1995, Fremont, CA., pp. 673-698.

Bittner, R. et al., "Colt: An Experiment in Wormhole Run-Time Reconfiguration," Bradley Department of Electrical and Computer Engineering, Blacksburg, VA, SPIE—International Society for Optical Engineering, vol. 2914/187, Nov. 1996, Boston, MA, pp. 187-194.

Camilleri, Nick; Lockhard, Chris, *Xilinx Application Note*, "Improving XC4000 Design Performance," XAPP 043.000, 1994, pp. 8-21 through 8-35.
Cartier, Lois, *Xilinx Application Note*, "System Design with New XC4000EX I/O Features," Feb. 21, 1996, pp. 1-8.
Chen, D., (Thesis) "Programmable arithmetic devices for high speed digital signal processing," U. California Berkeley 1992, pp. 1-175.
Churcher, S., et al., "The XC6200 FastMap TM Processor Interface," Xilinx, Inc., Aug. 1995, pp. 1-8.
Cowie, Beth, *Xilinx Application Note*, "High Performance, Low Area, Interpolator Design for the XC6200," XAPP 081, May 7, 1997 (Version 1.0), pp. 1-10.
Duncan, Ann, *Xilinx Application Note*, "A32x16 Reconfigurable Correlator for the XC6200," XAPP 084, Jul. 25, 1997 (Version 1.0), pp. 1-14.
Ebeling, C., et al., "RaPiD—Reconfigurable Pipelined Datapath," Dept. of Computer Science and Engineering, U. Washington, 1996, pp. 126-135.
Epstein, D., "IBM Extends DSP Performance with Mfast—Powerful Chip Uses Mesh Architecture to Accelerate Graphics, Video," 1995 MicroDesign Resources, vol. 9, No. 16, Dec. 4, 1995, pp. 231-236.
Fawcett, B., "New SRAM-Based FPGA Architectures Address New Applications," Xilinx, Inc. San Jose, CA, Nov. 1995, pp. 231-236.
Goslin, G; Newgard, B, *Xilinx Application Note*"16-Tap, 8-Bit FIR Filter Applications Guide," Nov. 21, 1994, pp. 1-5.
Iwanczuk, Roman, *Xilinx Application Note*, "Using the XC4000 RAM Capability," XAPP 031.000, 1994, pp. 8-127 through 8-138.
Knapp, Steven, "Using Programmable Logic to Accelerate DSP Functions," Xilinx, Inc., 1995, pp. 1-8.
New, Bernie, *Xilinx Application Note*, "Accelerating Loadable Counters in SC4000," XAPP 023.001, 1994, pp. 8-82 through 8-85.
New, Bernie, *Xilinx Application Note*, "Boundary Scan Emulator for XC3000," XAPP 007.001, 1994, pp. 8-53 through 8-59.
New, Bernie, *Xilinx Application Note*, "Ultra-Fast Synchronous Counters," XAPP 014.001, 1994, pp. 8-78 through 8-81.
New, Bernie, *Xilinx Application Note*, "Using the Dedicated Carry Logic in XC4000," XAPP 013.001, 1994, pp. 8-105 through 8-115.
New, Bernie, *Xilinx Application Note*, "Complex Digital Waveform Generator," XAPP 008.002, 1994, pp. 8-163 through 8-164.
New, Bernie, *Xilinx Application Note*, "Bus-Structured Serial Input-Output Device," XAPP 010.001, 1994, pp. 8-181 through 8-182.
Ridgeway, David, *Xilinx Application Note*, "Designing Complex 2-Dimensional Convolution Filters," XAPP 037.000, 1994, pp. 8-175 through 8-177.
Rowson, J., et al., "Second-generation compilers optimize semicustom circuits," Electronic Design, Feb. 19, 1987, pp. 92-96.
Schewel, J., "A Hardware/Software Co-Design System using Configurable Computing Technology," Virtual Computer Corporation, Reseda, CA, IEEE 1998, pp. 620-625.
Segers, Dennis, Xilinx Memorandum, "MIKE—Product Description and MRD," Jun. 8, 1994, pp. 1-29.
Texas Instruments, "TMS320C8x System-Level Synopsis," Sep. 1995, 75 pages.
Texas Instruments, "TMS320C80 Digital Signal Processor," Data Sheet, Digital Signal Processing Solutions 1997, 171 pages.
Texas Instruments, "TMS320C80 (MVP) Parallel Processor," User's Guide, Digital Signal Processing Products 1995, 73 pages.
Trainor, D.W., et al., "Implementation of the 2D DCT Using a Xilinx XC6264 FPGA," 1997, IEEE Workshop of Signal Processing Systems SiPS 97, pp. 541-550.
Trimberger, S, (Ed.) et al., "Field-Programmable Gate Array Technology," 1994, Kluwer Academic Press, pp. 1-258 (and the Title Page, Table of Contents, and Preface) [274 pages total].
Trimberger, S., "A Reprogrammable Gate Array and Applications," IEEE 1993, Proceedings of the IEEE, vol. 81, No. 7, Jul. 1993, pp. 1030-1041.
Trimberger, S., et al., "A Time-Multiplexed FPGA," Xilinx, Inc., 1997 IEEE, pp. 22-28.
Ujvari, Dan, *Xilinx Application Note*, "Digital Mixer in an XC7272," XAPP 035.002, 1994, p. 1.
Veendrick, H., et al., "A 1.5 GIPS video signal processor (VSP)," Philips Research Laboratories, The Netherlands, IEEE 1994 Custom Integrated Circuits Conference, pp. 95-98.
Wilkie, Bill, *Xilinx Application Note*, "Interfacing XC6200 To Microprocessors (TMS320C50 Example)," XAPP 064, Oct. 9, 1996 (Version 1.1), pp. 1-9.
Wilkie, Bill, *Xilinx Application Note*, "Interfacing XC6200 To Microprocessors (MC68020 Example)," XAPP 063, Oct. 9, 1996 (Version 1.1), pp. 1-8.
XCELL, Issue 18, Third Quarter 1995, "Introducing three new FPGA Families!"; "Introducing the XC6200 FPGA Architecture: The First FPGA Architecture Optimized for Coprocessing in Embedded System Applications," 40 pages.
*Xilinx Application Note*, Advanced Product Specification, "XC6200 Field Programmable Gate Arrays," Jun. 1, 1996 (Version 1.0), pp. 4-253—4-286.
*Xilinx Application Note*, A Fast Constant Coefficient Multiplier for the XC6200, XAPP 082, Aug. 24, 1997 (Version 1.0), pp. 1-5.
Xilinx Technical Data, "XC5200 Logic Cell Array Family," Preliminary (v1.0), Apr. 1995, pp. 1-43.
Xilinx Data Book, "The Programmable Logic Data Book," 1996, 909 pages.
Xilinx, Series 6000 User's Guide, Jun. 26, 1997, 223 pages.
Yeung, K., (Thesis) "A Data-Driven Multiprocessor Architecture for High Throughput Digital Signal Processing," Electronics Research Laboratory, U. California Berkeley, Jul. 10, 1995, pp. 1-153.
Yeung, L., et al., "A 2.4GOPS Data-Driven Reconfigurable Multi-processor IC for DSP," Dept. of EECS, U. California Berkeley, 1995 IEEE International Solid State Circuits Conference, pp. 108-110.
ZILOG Preliminary Product Specification, "Z86C95 CMOS Z8 Digital Signal Processor," 1992, pp. 1-82.
ZILOG Preliminary Product Specification, "Z89120 Z89920 (ROM-less) 16-Bit Mixed Signal Processor," 1992, pp. 1-82.
Defendants' Invalidity Contentions in *PACT XPP Technologies, AG v. XILINX, Inc., et al.*, (E.D. Texas Dec. 28, 2007) (No. 2:07cv563)., including Exhibits a through K in separate PDF files.
Altera, "2. TriMatrix Embedded Memory Blocks in Stratix & Stratix GX Devices," Altera Corporation, Jul. 2005, 28 pages.
Altera, "Apex II Programmable Logic Device Family," Altera Corporation Data Sheet, Aug. 2002, Ver. 3.0, 99 pages.
Becker, J., "A Partitioning Compiler for Computers with Xputer-based Accelerators," 1997, Kaiserslautern University, 326 pp.
"BlueGene/L—Hardware Architecture Overview," BlueGene/L design team, IBM Research, Oct. 17, 2003 slide presentation, pp. 1-23.
"BlueGene/L: the next generation of scalable supercomputer," Kissel et al., Lawrence Livermore National Laboratory, Livermore, California, Nov. 18, 2002, 29 pages.
BlueGene Project Update, Jan. 2002, IBM slide presentation, 20 pages.
BlueGene/L, "An Overview of the BlueGene/L Supercomputer," The BlueGene/L Team, IBM and Lawrence Livermore National Laboratory, 2002 IEEE. pp. 1-22.
Epstein, Dave, "IBM Extends DSP Performance with Mfaxt," Microprocessor Report, vol. 9, No. 16 (MicroDesign Resources), Dec. 4, 1995, pp. 1-4 [XL0029013].
Galanis, M.D. et al., "Accelerating Applications by Mapping Critical Kernels on Coarse-Grain Reconfigurable Hardware in Hybrid Systems," Proceedings of the 13th Annual IEEE Symposium on Field-Programmable Custom Computing Machines, 2005, 2 pages.
Guo, Z. et al., "A Compiler Intermediate Representation for Reconfigurable Fabrics," University of California, Riverside, Dept. of Electrical Engineering, IEEE 2006, 4 pages.
Gwennap, Linley, "P6 Underscores Intel's Lead," Microprocessor Report, vol. 9., No. 2, Feb. 16, 1995 (MicroDesign Resources), p. 1 and pp. 6-15.
Gwennap, Linley, "Intel's P6 Bus Designed for Multiprocessing," Microprocessor Report, vol. 9, No. 7 (MicroDesign Resources), May 30, 1995, p. 1 and pp. 6-10.
Hartenstein et al., "Parallelizing Compilation for a Novel Data-Parallel Architecture," 1995, PCAT-94, Parallel Computing: Technology and Practice, 13 pp.
Hartenstein et al., "A Two-Level Co-Design Framework for Xputer-based Data-driven Reconfigurable Accelerators," 1997, Proceedings of the Thirtieth Annual Hawaii International Conference on System Sciences, 10 pp.

Huang, Libo et al., "A New Architecture for Multiple-Precision Floating-Point Multiply-Add Fused Unit Design," School of Computer National University of Defense Technology, China, IEEE 2007, 8 pages.

Intel, "Pentium Pro Family Developer's Manual , vol. 3: Operating System Writer's Guide," Intel Corporation, Dec. 1995, [submitted in 4 PDF files: Part I, Part II, Part III and Part IV], 458 pages.

Jo, Manhwee et al., "Implementation of Floating-Point Operations for 3D Graphics on a Coarse-Grained Reconfigurable Architecture," Design Automation Laboratory, School of EE/CS, Seoul National University, Korea, IEEE 2007, pp. 127-130.

Xilinx, White Paper 370: (Virtex-6 and Spartan-6 FPGA Families) "Reducing Switching Power with Intelligent Clock Gating," Frederic Rivoallon, May 3, 2010, pp. 1-5.

Xilinx, White Paper 298: (Spartan-6 and Virtex-6 Devices) "Power Consumption at 40 and 50 nm," Matt Klein, Apr. 13, 2009, pp. 1-21.

Chaudhry, G.M. et al., "Separated caches and buses for multiprocessor system," Circuits and Systems, 1993; Proceedings of the 36th Midwest Symposium on Detroit, MI, USA, Aug. 16-18, 1993, New York, NY IEEE, Aug. 16, 1993, pp. 1113-1116, XP010119918 ISBN: 0-7803-1760-2.

Culler, D.E; Singh, J.P., "Parallel Computer Architecture," pp. 434-437, 1999, Morgan Kaufmann, San Francisco, CA USA, XP002477559.

Jantsch, Axel et al., "Hardware/Software Partitioning and Minimizing Memory Interface Traffic," Electronic System Design Laboratory, Royal Institute of Technology, ESDLab, Electrum 229, S-16440 Kista, Sweden (Apr. 1994), pp. 226-231.

Lange, H. et al., "Memory access schemes for configurable processors,"Field-Programmable Logic and Applications, International Workshop, FPL, Aug. 27, 2000, pp. 615-625, XP02283963.

Lee, Ming-Hau et al., "Designs and Implementation of the MorphoSys Reconfigurable Computing Processors," The Journal of VLSI Signal Processing, Kluwer Academic Publishers, BO, vol. 24, No. 2-3, Mar. 2, 2000, pp. 1-29.

Ohmsha, "Information Processing Handbook," edited by the Information Processing Society of Japan, pp. 376, Dec. 21, 1998.

Ryo, A., "Auszug aus Handbuch der Informationsverarbeitung," ed. Information Processing Society of Japan, *Information Processing Handbook, New Edition*, Software Information Center, Ohmsha, Dec. 1998, 4 pages. [Translation provided].

Xilinx, "The Programmable Logic Data Book," 1994, Section 2, pp. 1-231, Section 8, pp. 1, 23-25, 29, 45-52, 169-172.

Abnous et al., "Ultra-Low-Power Domain-Specific Multimedia Processors," U.C. Berkeley, 1996 IEEE, pp. 461-470.

Albaharna, O.T. et al., "On the Viability of FPGA-Based Integrated Coprocessors," Dept. of Electrical and Electronic Engineering, Imperial College of Science, London, 1999 IEEE, pp. 206-215.

Altera, "Flex 8000 Programmable Logic Device Family," Altera Corporation product description, Jan. 2003, pp. 1-62.

Altera, "Flex 10K Embedded Programmable Logic Device Family," Altera Corporation product description, Jan. 2003, pp. 1-128.

Athanas et al., "Processor Reconfiguration Through Instruction-Set Metamorphosis," 1993, IEEE Computers, pp. 11-18.

Atmel, 5-K-50K Gates Coprocessor FPGA with Free Ram, Data Sheet, Jul. 2006, 55 pages.

Atmel, FPGA-based FIR Filter Application Note, Sep. 1999, 10 pages.

Atmel, "An Introduction to DSP Applications using the AT40K FPGA," FPGA Application Engineering, San Jose, CA, Apr. 2004, 15 pages.

Atmel, Configurable Logic Design & Application Book, Atmel Corporation, 1995, pp. 2-19 through 2-25.

Atmel, Field Programmable Gate Array Configuration Guide, AT6000 Series Configuration Data Sheet, Sep. 1999, pp. 1-20.

Bacon, D. et al., "Compiler Transformations for High-Performance Computing," ACM Computing Surveys, 26(4):325-420 (1994).

Bakkes, P.J., et al., "Mixing Fixed and Reconfigurable Logic for Array Processing," Dept. of Electrical and Electronic Engineering, University of Stellenbosch, South Africa, 1996 IEEE, pp. 118-125.

Becker, J. et al., "Architecture, Memory and Interface Technology Integration of an Industrial/Academic Configurable System-on-Chip (CSoC)," IEEE Computer Society Annual Workshop on VLSI (WVLSI 2003), (Feb. 2003).

Becker, J., "Configurable Systems-on-Chip (CSoC)," (Invited Tutorial), Proc. of 9th Proc. of XV Brazilian Symposium on Integrated Circuit, Design (SBCCI 2002), (Sep. 2002).

Becker et al., "Automatic Parallelism Exploitation for FPL-Based Accelerators." 1998, Proc. 31st Annual Hawaii International Conference on System Sciences, pp. 169-178.

Bratt, A, "Motorola field programmable analogue arrays, present hardware and future trends," Motorola Programmable Technology Centre, Gadbrook Business Centre, Northwich, Cheshire, 1998, The Institute of Electrical Engineers, IEE. Savoy Place, London, pp. 1-5.

Cardoso, J.M.P. et al., "A novel algorithm combining temporal partitioning and sharing of functional units," University of Algarve, Faro, Portugal, 2001 IEEE, pp. 1-10.

Cardoso, J.M.P. et al., "Compilation and Temporal Partitioning for a Coarse-Grain Reconfigurable Architecture," Lysacht, P. & Rosentiel, W. eds., "New Algorithms, Architectures and Applications for Reconfiguraable Computing," (2005) pp. 105-115.

Cardoso, J.M.P. et al., "Macro-Based Hardware Compilation of Java™ Bytecodes into a Dynamic Reconfigurable Computing System," Field-Programmable Custom Computing Machines (1999) FCCM '99. Proceedings. Seventh Annual IEEE Symposium on Napa Valley, CA, USA, Apr. 21-23, 1999, IEEE Comput. Soc, US, pp. 2-11.

Clearspeed, CSX Processor Architecture, Whitepaper, PN-1110-0702, 2007, pp. 1-15, www.clearspeed.com.

Clearspeed, CSX Processor Architecture, Whitepaper, PN-1110-0306, 2006, pp. 1-14, www.clearspeed.com.

Compton, K. et al., "Configurable Computing: A Survey of Systems and Software," Northwestern University, Dept. of ECE, Technical Report, 1999, (XP-002315148), 39 pages.

Cook, Jeffrey J., "The Amalgam Compiler Infrastructure," Thesis at the University of Illinois at Urbana-Champaign (2004) Chapter 7 & Appendix G.

Cronquist, D. et al., "Architecture Design of Reconfigurable Pipelined Datapaths," Department of Computer Science and Engineering, University of Washington, Seattle, WA, Proceedings of the 20th Anniversary Conference on Advanced Research in VSLI, 1999, pp. 1-15.

DeHon, Andre, "Reconfigurable Architectures for General-Purpose Computing," Massachusetts Institute of Technology, Technical Report AITR-1586, Oct. 1996, XP002445054, Cambridge, MA, pp. 1-353.

Diniz, P., et al., "A behavioral synthesis estimation interface for configurable computing," University of Southern California, Marina Del Rey, CA, 2001 IEEE, pp. 1-2.

Ebeling, C. et al., "Mapping Applications to the RaPiD Configurable Architecture," Department of Computer Science and Engineering, University of Washington, Seattle, WA, *FPGAs for Custom Computing Machines, 1997. Proceedings., The 5th Annual IEEE Symposium*, Publication Date: Apr. 16-18, 1997, 10 pages.

Equator, Pixels to Packets, Enabling Multi-Format High Definition Video, Equator Technologies BSP-15 Products Brief, www.equator.com, 2001, 4 pages.

Fawcett, B.K., "Map, Place and Route: The Key to High-Density PLD Implementation," Wescon Conference, IEEE Center (Nov. 7, 1995) pp. 292-297.

Freescale Slide Presentation, An Introduction to Motorola's RCF (Reconfigurable Compute Fabric) Technology, Presented by Frank David, Launched by Freescale Semiconductor, Inc., 2004, 39 pages.

Genius, D. et al., "A Case for Array Merging in Memory Hierarchies," Proceedings of the 9th International Workshop on Compilers for Parallel Computer, CPC'01 (Jun. 2001), 10 pages.

Hartenstein, R. et al., "A new FPGA architecture for word-oriented datapaths," Proc. FPL'94, Springer LNCS, Sep. 1994, pp. 144-155.

Hendrich, N., et al., "Silicon Compilation and Rapid Prototyping of Microprogrammed VLSI-Circuits with MIMOLA and SOLO 1400," Microprocessing & Microprogramming (Sep. 1992) vol. 35(1-5), pp. 287-294.

Hwang, K., "Computer Architecture and Parallel Processing," Data Flow Computers and VLSI Computations, XP-002418655, 1985 McGraw-Hill, Chapter 10, pp. 732-807.

IBM Technical Disclosure Bulletin, IBM Corp., New York, XP000424878, Bd. 36, Nr. 11, Nov. 1, 1993, pp. 335-336.

Inside DSP, "Ambric Discloses Massively Parallel Architecture," Aug. 23, 2006, HTTP://insidedsp.com/tabid/64/articleType/ArticleView/articleld/155/Defa..., 2 pages.

Intel, Intel MXP5800/MXP5400 Digital Media Processors, Architecture Overview, Jun. 2004, Revision 2.4, pp. 1-24.

Kaul, M., et al., "An automated temporal partitioning and loop fission approach of FPGA based reconfigurable synthesis of DSP applications," University of Cincinnati, Cincinnati, OH, ACM 1999, pp. 616-622.

Kean, T.A., "Configurable Logic: A Dynamically Programmable Cellular Architecture and its VLSI Implementation," University of Edinburgh (Dissertation) 1988, pp. 1-286.

Kean, T., et al., "A Fast Constant Coefficient Multiplier for the XC6200," Xilinx, Inc., Lecture Notes in Computer Science, vol. 1142, Proceedings of the 6$^{th}$ International Workshop of Field-Programmable Logic, 1996, 7 pages.

Kim et al., "A Reconfigurable Multifunction Computing Cache Architecture," IEEE Transactions on Very Large Scale Integration (VLSI) Systems vol. 9, Issue 4, Aug. 2001, pp. 509-523.

Knittel, Gunter, "A PCI-compatible FPGA-Coprocessor for 2D/3D Image Processing," University of Turgingen, Germany, 1996 IEEE, pp. 136-145.

Koch, Andreas et al., "High-Level-Language Compilation for Reconfigurable Computers," Proceedings of European Workshop on Reconfigurable Communication-Centric SOCS (Jun. 2005) 8 pages.

Larsen, S. et al., "Increasing and Detecting Memory Address Congruence," Proceedings of the 2002 IEEE International Conference on Parallel Architectures and Compilation Techniques (PACT'02), pp. 1-12 (Sep. 2002).

Lee et al., "A new distribution network based on controlled switching elements and its applications," IEEE/ACT Trans. of Networking, vol. 3, No. 1, pp. 70-81, Feb. 1995.

Margolus, N., "An FPGA architecture for DRAM-based systolic computations," Boston University Center for Computational Science and MIT Artificial Intelligence Laboratory, IEEE 1997, pp. 2-11.

Mei, Bingfeng, "A Coarse-Grained Reconfigurable Architecture Template and Its Compilation Techniques," Katholeike Universiteit Leuven, PhD Thesis, Jan. 2005, IMEC vzw, Universitair Micro-Electronica Centrum, Belgium, pp. 1-195 (and Table of Contents).

Mei, Bingfeng, et al., "Design and Optimization of Dynamically Reconfigurable Embedded Systems," IMEC vzw, 2003, Belgium, 7 pages, http://www.imec.be/reconfigurable/pdf/ICERSA_01_design.pdf.

Miyamori, T. et al., "REMARC: Reconfigurable Multimedia Array Coprocessor," Computer Systems Laboratory, Stanford University, IEICE Transactions on Information and Systems E Series D, 1999; (abstract): Proceedings of the 1998 ACM/SIGDA sixth international symposium on Field programmable gate arrays, p. 261, Feb. 22-25, 1998, Monterey, California, United States, pp. 1-12.

Moraes, F., et al., "A Physical Synthesis Design Flow Based on Virtual Components," XV Conference on Design of Circuits and Integrated Systems (Nov. 2000) 6 pages.

Muchnick, S., "Advanced Compiler Design and Implementation" (Morgan Kaufmann 1997), Table of Contents, 11 pages.

Murphy, C., "Virtual Hardware Using Dynamic Reconfigurable Field Programmable Gate Arrays," Engineering Development Centre, Liverpool John Moores University, UK, GERI Annual Research Symposium 2005, 8 pages.

Nageldinger, U., "Design-Space Exploration for Coarse Grained Reconfigurable Architectures," (Dissertation) Universitaet Kaiserslautern, 2000, Chapter 2, pp. 19-45.

Neumann, T., et al., "A Generic Library for Adaptive Computing Environments," Field Programmable Logic and Applications, 11$^{th}$ International Conference, FPL 2001, Proceedings (Lecture Notes in Computer Science, vol. 2147) (2001) pp. 503-512.

Olukotun, K., "The Case for a Single-Chip Microprocessor," ACM Sigplan Notices, ACM, Association for Computing Machinery, New York, vol. 31, No. 9, Sep. 1996 pp. 2-11.

PACT Corporation, "The XPP Communication System," Technical Report 15 (2000), pp. 1-16.

Quenot, G.M., et al., "A Reconfigurable Compute Engine for Real-Time Vision Automata Prototyping," Laboratoire Systeme de Perception, DGA/Etablissement Technique Central de l'Armement, France, 1994 IEEE, pp. 91-100.

Parhami, B., "Parallel Counters for Signed Binary Signals," Signals, Systems and Computers, 1989, Twenty-Third Asilomar Conference, vol. 1, pp. 513-516.

Saleeba, Z.M.G., "A Self-Reconfiguring Computer System," Department of Computer Science, Monash University (Dissertation) 1998, pp. 1-306.

Schmidt, H. et al., "Behavioral synthesis for FGPA-based computing," Carnegie Mellon University, Pittsburgh, PA, 1994 IEEE, pp. 125-132.

Schönfeld, M., et al., "The LISA Design Environment for the Synthesis of Array Processors Including Memories for the Data Transfer and Fault Tolerance by Reconfiguration and Coding Techniques," J. VLSI Signal Processing Systems for Signal, Image, and Video Technology, (Oct. 1, 1995) vol. 11(1/2), pp. 51-74.

Shin, D., et al., "C-based Interactive RTL Design Methodology," Technical Report CECS-03-42 (Dec. 2003) pp. 1-16.

Singh, H. et al., "MorphoSys: An Integrated Reconfigurable System for Data-Parallel Computation-Intensive Applications," University of California, Irvine, CA. and Federal University of Rio de Janeiro, Brazil, 2000, IEEE Transactions on Computer, pp. 1-35.

Sondervan, J., "Retiming and logic synthesis," Electronic Engineering (Jan. 1993) vol. 65(793), pp. 33, 35-36.

Soni, M., "VLSI Implementation of a Wormhole Run-time Reconfigurable Processor," Jun. 2001, (Masters Thesis)Virginia Polytechnic Institute and State University, 88 pages.

Sutton et al., "A Multiprocessor DSP System Using PADDI-2," U.C. Berkeley, 1998 ACM, pp. 62-65.

Tsutsui, A., et al., "YARDS: FPGA/MPU Hybrid Architecture for Telecommunication Data Processing," NTT Optical Network Systems Laboratories, Japan, 1997 ACM, pp. 93-99.

Vasell et al., "The Function Processor: A Data-Driven Processor Array for Irregular Computations," Chalmers University of Technology, Sweden, pp. 1-21, Sep. 1992.

Waingold, E., et al., "Baring it all to software: Raw machines," IEEE Computer, Sep. 1997, at 86-93.

Weinhardt, Markus et al., "Memory Access Optimization for Reconfigurable Systems," IEEE Proceedings Computers and Digital Techniques, 48(3) (May 2001) pp. 1-16.

Wolfe, M. et al., "High Performance Compilers for Parallel Computing" (Addison-Wesley 1996) Table of Contents, 11 pages.

XILINX, "Spartan and SpartanXL Families Field Programmable Gate Arrays," Jan. 1999, Xilinx, pp. 4-3 through 4-70.

XILINX, "XC6200 Field Programmable Gate Arrays," Apr. 24, 1997, Xilinx product description, pp. 1-73.

XILINX, "XC3000 Series Field Programmable Gate Arrays," Nov. 6, 1998, Xilinx product description, pp. 1-76.

XILINX, "XC4000E and XC4000X Series Field Programmable Gate Arrays," May 14, 1999, Xilinx product description, pp. 1-68.

XILINX, "Virtex-E 1.8 V Extended Memory Field Programmable Gate Arrays," Jul. 17, 2002, Xilinx Production Product Specification, pp. 1-118.

XILINX, "Virtex-II and Virtex-II Pro X FPGA User Guide," Mar. 28, 2007, Xilinx user guide, pp. 1-559.

Zhang, et al., "Architectural Evaluation of Flexible Digital Signal Processing for Wireless Receivers, Signals, Systems and Computers," 2000; Conference Record of the Thirty-Fourth Asilomar Conference, Bd. 1, Oct. 29, 2000, pp. 78-83.

Zhang, et al., "A 1-V Heterogeneous Reconfigurable DSP IC for Wireless Baseband Digital Signal Processing," IEEE Journal of Solid-State Circuits, vol. 35, No. 11, Nov. 2000, pp. 1697-1704.

Zhang et al., "Abstract: Low-Power Heterogeneous Reconfigurable Digital Signal Processors with Energy-Efficient Interconnect Network," U.C. Berkeley (2004), pp. 1-120.

Zima, H. et al., "Supercompilers for parallel and vector computers" (Addison-Wesley 1991) Table of Contents, 5 pages.

* cited by examiner

METHOD FOR DEBUGGING RECONFIGURABLE ARCHITECTURES

CROSS-REFERENCE TO RELATED APPLICATIONS

This application is a continuation of U.S. patent application Ser. No. 09/967,497, filed on Sep. 28, 2001, now U.S. Pat. No. 7,266,725 which claims benefit of priority under 35 U.S.C. §119 to German Patent Applications Serial Nos. 101 42 904.5, filed on Sep. 3, 2001 and 101 44 733.7, filed on Sep. 11, 2001, the entire contents of each of which are expressly incorporated herein by reference thereto.

FIELD OF THE INVENTION

The present invention relates to methods for debugging programs on configurable architectures.

BACKGROUND INFORMATION

A reconfigurable architecture includes chips (VPU) with configurable function and/or networking, particularly integrated chips with a multiplicity of arithmetic and/or logic and/or analog and/or storing and/or networking modules arranged one-dimensionally or multidimensionally (called PAEs in the text which follows) and/or communicative/peripheral modules (IO) which are connected to one another either directly or by one or more bus system(s). PAEs are arranged in any design, mixture and hierarchy. This arrangement will be called PAE array or PA in the further text.

The conventional type of these chips includes systolic arrays, neuron networks, multiprocessor systems, processors having a number of arithmetic logic units and/or logic cells, networking and network chips such as e.g. crossbar switches and also known chips of the conventional FPGA, DPGA, XPUTER etc. type. Particular reference is made in this context to the following patents by the same applicant: P 44 16 881.0-53, DE 197 81 412.3, DE 197 81 483.2, DE 196 54 846.2-53, DE 196 54 593.5-53, DE 197 04 044.6-53, DE 198 80 129.7, DE 198 61 088.2-53, DE 199 80 312.9, PCT/DE 00/01869, DE 100 36 627.9-33, DE 100 28 397.7, DE 101 10 530.4, DE 101 11 014.6, PCT/EP 00/10516, EP 01 102 674.7, each of which is expressly incorporated herewith by reference in its entirety.

It should also be noted that the methods can also be applied to groups of a number of chips.

SUMMARY

A number of methods and hardware implementations are presented which may enable VPU systems to be efficiently debugged.

Debugging may take place either by using a microcontroller appropriately connected to a VPU or by a loading as described in U.S. Pat. No. 5,943,242 (PACT01), U.S. Pat. No. 6,424,068 (PACT02), U.S. Pat. No. 6,088,795 (PACT04), U.S. Pat. No. 6,021,490 (PACT05), U.S. Ser. No. 09/598,926 (PACT09), U.S. Ser. No. 09/623,052 (PACT10), U.S. Ser. No. 09/967,847 (PACT11), U.S. Ser. No. 10/009,649 (PACT13), (PACT17), each of which is expressly incorporated herewith by reference in its entirety.

DETAILED DESCRIPTION

Figure 1:
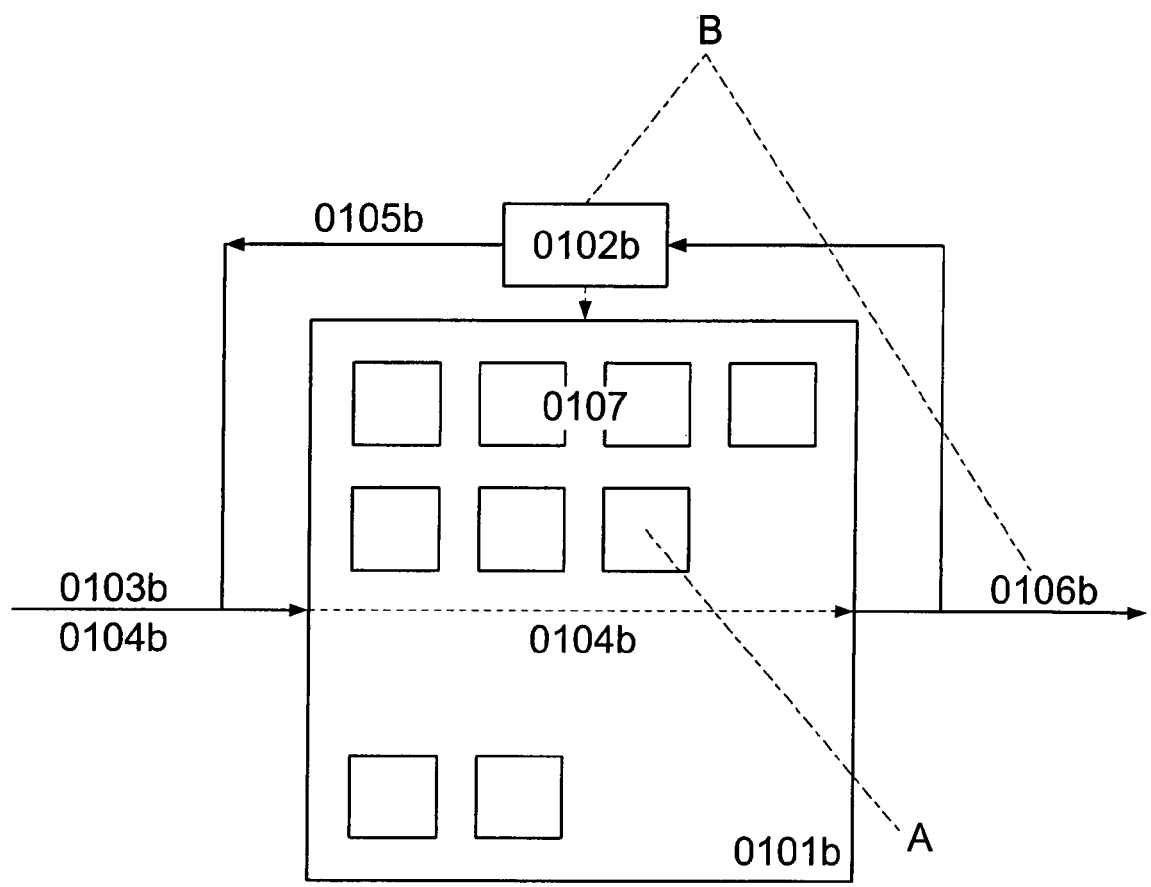
FIG. 1 illustrates a representation of an example embodiment of the finite state machine by a reconfigurable architecture.

Example Embodiment of Detection of a Debugging Condition

The programmer may specify, for example within the debugging tool, one or more conditions which start the debugging. The occurrence of the conditions may be determined at run time in the VPU. This may take place due to the occurrence of particular data values at particular variables and/or particular trigger values at particular PAEs.

Example Embodiment of Detection of a Debugging Condition

Precondition

In this example embodiment, a particular condition according to the abovementioned definition may be established by the programmer a number of clock cycles before the occurrence of the debugging condition. This may eliminate latency problems which will be discussed in the text which follows.

In the text which follows, two fundamental types of debugging for VPUs will be discussed, the method which may be employed in each case may depend on the choice of compiler: For compilers which generate code on the basis of instanced modules of a hardware description language (or similar language), method A may be particularly suitable and will be described in the text which follows.

For compilers similar to PACT11 which generate complex instructions in accordance with a method similar to VLIW, method B may be particularly suitable and will be described in the text which follows.

Example Embodiment of Method A

Basic Principle

After the occurrence of a (pre)condition, the VPU may be stopped. After that, the relevant debugging information may be transferred from the PAEs to the debugging program. The relevant debugging information may have previously been established by the programmer in the debugging program. After all relevant debugging information has been read out, the next clock cycle may be executed and the relevant debugging information may be read out again. This may be repeated until the programmer terminates the debugging process.

Method A

Example Embodiment of Support by the Hardware—Reading Out the Registers

One factor for the operation of the debugger is the possibility for the CT or another processor connected externally (called debugging processor (DB) in the text which follows) to read back in the internal data registers and/or status registers and/or state registers, and if possible, depending on implementation, other relevant registers and/or signals from the PAEs and/or the network (collectively known as debugging information in the text which follows). Such a possibility may be implemented, for example, with the connection between the loading logic and the data bus of a PAE created in U.S. Pat. No. 6,081,903 (PACT08/PCT) (PACT08/PCT 0403, FIG. 4).

It should be expressly noted that serial methods may also be used for reading out the registers. For example, JTAG may be selected and DB may also be connected, if necessary, as external separate device via this method.

Method A

Example Embodiment of Support by the Hardware—Stopping or Slowing Down the Clock Due to the occurrence of a condition and/or precondition, the clock may either be stopped or slowed down in order to provide sufficient readout time. This beginning of debugging may be triggered either directly by a PAE which calculated the (pre)condition(s) or by a loading logic due to any actions, for example due to the information that a (pre)condition occurred at a PAE and/or due to an action within the debugging processor and/or by any program and/or any external/peripheral source. To provide information, trigger mechanisms according to U.S. Pat. No. 5,943,242 (PACT01), U.S. Pat. No. 6,425,068 (PACT02), U.S. Pat. No. 6,081,903 (PACT08), U.S. Ser. No. 09/623,052 (PACT10), (PACT12), (PACT17) are available.

If the clock is slowed down, all relevant debugging information may need to be read out of the PAEs by the debugging processor within the slowed-down cycle of the processing clock.

If the clock is stopped, a single-step mode may be produced, i.e. the debugging processor may stop the processing clock until it has read out all debugging information. After that, it may restart the processing clock for one cycle and stop it again until all relevant debugging information has been read out.

The readout clock and the clock of the debugging processor may be independent of the processing clock of the PAEs so that the data processing is separate from the debugging and particularly the reading out of the debugging information.

With respect to the hardware, the stopping or slowing down of the clock may be achieved by conventional methods, such as, for example, gated clocks and/or PLLs and/or dividers or other methods.

Method A

Example Embodiment of Support by the Hardware—Register Pipeline for Compensating for Latency At higher operating frequencies, latency may occur between the detection of the beginning of debugging and the stopping or slowing down of the clock. This latency may be precisely predetermined since the position of the delaying registers in the VPU may be defined by hardware and/or the algorithm to be debugged and may, therefore, be calculated precisely by the debugger.

However, the latency may shift the information provided to the debugging processor, in such a manner that it is no longer possible to read out the correct debugging information.

By inserting a multistage register pipeline which may transmit the debugging information in each clock cycle further by one register, the debugging processor may refer back to the same number of clock cycles of debugging information as the register pipeline is long.

Due to the precise calculability of the latency, the debugging program may now read out the relevant debugging information of the correct time from the register pipeline.

Method A

Example Embodiment of Visible Debugging Information

In this method, debugging may take place after the occurrence of the (pre)condition since it may be only after that that the clock may be slowed down or stopped and the debugging information may be read out. Debugging information from before the occurrence of the (pre)condition may not be visible initially.

However, it is possible, although with the loss of operating performance, to operate a VPU with a slowed-down clock or a single-step mode right from the start of an application. The relevant debugging information may be read out by the debugging processor from the start.

Example Embodiment of Method B

Basic Principle

Relevant debugging information from the memory units which, according U.S. Pat. No. 5,943,242 (PACT01), U.S. Pat. No. 6,088,795 (PACT04), U.S. Ser. No. 10/009,649 (PACT13), U.S. Ser. No. 09/967,847 (PACT11), (PACT18), contain the application data and states of a particular operating step, may be transmitted to the debugging program. In the machine model of U.S. Pat. No. 5,943,242 (PACT01), U.S. Pat. No. 6,088,795 (PACT04), U.S. Ser. No. 09/967,847 (PACT11), U.S. Ser. No. 10/009,649 (PACT13), (PACT18), these memory units may operate as registers for storing data which has been calculated in the PA or parts of the PA within a configuration cycle. A memory unit may consist of an arbitrary arrangement and hierarchy of independent and dependent memories. It is possible to execute simultaneously a number of different algorithms on the PA which then use different memories.

For the application of this method that data and/or algorithmically relevant states may need to be stored in the memory units associated with the PAEs. A memory unit may be in each case dimensioned at least in such a manner that all relevant data and/or states of a cycle may be stored; the length of a cycle may be determined by the size of the memory unit.

Different data and/or states may be stored in the memory units in such a manner that they may be unambiguously correlated with the algorithm. As a result, the debugger may unambiguously identify the relevant data and/or states (debugging information).

The relevant debugging information may have been previously specified by the programmer within the debugging program. This debugging information may be read out of the memory units. Different methods are available for this and some possibilities will be described in greater detail in the text which follows. After all relevant debugging information has been read out, the next configuration cycle may be executed and the relevant debugging information may be read out again. This may be repeated until the programmer/debugger terminates the debugging process.

In other words, the relevant data and/or status information may be transmitted to the debugger configuration by configuration rather than clock cycle by clock cycle. This may occur from the memory units which are comparable to the registers of a CPU.

Example Embodiment of Method B

Support by the Hardware

A factor for the operation of the debugger may be the possibility for the CT or any other processor connected externally (called debugging processor (DB) in the text which follows) to read the, for example, also internal, memory unit of the VPU. Such a possibility may be given, for example, by the CT being connected to the memories for preloading and reading the data and/or by the methods for writing the internal memories to external memories, described in PACT13. Memory (units) may be accessed by the debugging processor by various conventional methods (e.g., shared memory, bank switching).

According to the method A, the clock for reading out the memories may be either correspondingly slowed down, if necessary, or stopped and generated in single-step mode. In this arrangement, special intervention in the clock may be omitted depending on the implementation of the memories, e.g., in the case of the bank switching method. According to method B, stopping or slowing down the clock and reading out and/or copying and/or switching of the memory unit may be done only when a data processing cycle or configuration cycle has ended.

Example Embodiment of Method B

Access to Debugging Information

In U.S. Pat. No. 5,943,242 (PACT01), U.S. Pat. No. 6,088,795(PACT04), U.S. Ser. No. 09/967,847 (PACT11), U.S. Ser. No. 10/009,649 (PACT13), data processing methods are described in which a set of operations may be cyclically mapped to a reconfigurable data processing chip. In each cycle, a plurality of data may be calculated which originate from a peripheral source and/or an internal/external memory and are written to a peripheral source and/or an internal/external memory. In this arrangement, different and/or, above all, a number of independent memories may be used simultaneously in each case.

In other words, the memory units or a part of the memory units may be used as register set in this data processing method.

According to U.S. Ser. No. 09/967,847 (PACT11) and U.S. Ser. No. 10/009,649 (PACT13), all data and states which may be relevant for the further data processing may be stored in the memory units or read out of these. States which may be irrelevant for the further data processing need not be stored.

The distinction between relevant and irrelevant states may be demonstrated in the following example and reference is made to PACT11:

The state information of a comparison may be essential, for example, for the further processing of the data since it determines the functions to be executed.

A sequential divider may be produced, for example, by mapping a division instruction onto a hardware which only supports sequential division. This may produce a state which identifies the computing step within the division. This state may be irrelevant since only the result (i.e. the division performed) is required for the algorithm. In this case, therefore, only the result and the time information (i.e. the availability) may be needed.

The time information may be obtained, for example, by the RDY/ACK handshake in the VPU technology of U.S. Pat. No. 5,943,242 (PACT01), U.S. Pat. No. 6,425,068 B1 (PACT02), U.S. Ser. No. 10/009,649 (PACT13). However, it may be noted in this respect that the handshake may not represent a relevant state, either, since it may only signals the validity of the data as a result of which the remaining relevant information may be again reduced to the existence of valid data.

A distinction between locally and globally relevant states is demonstrated in U.S. Ser. No. 09/967,847 (PACT11) as follows:

Local: the state is only relevant within a single completed configuration. For this reason, it is not mandatory to store the state.

Global: the state information is needed for a number of configurations. The state may need to be stored.

It is now possible that the programmer wants to debug a locally relevant state which is not stored in the memories. In this case, the application may need to be modified to the extent that a debugging configuration may be produced (equivalent to the debugging code of processors) which exhibits a modification of the "normal" code of the application in such a manner that this state may be additionally written into the memory unit and may be thus provided to the debugger.

Example Embodiment of Method B

Visible Debugging Information

Debugging before the (pre)condition may be comparatively simple and may be performed without great performance losses since the debugging information needed may be available in memories. The debugging information may be saved simply by copying the memories into other memory areas. An even faster method may be to switch the memories by means of a (conventional) bank switching method between the individual configurations in such a manner that the debugging information may be located in a new bank in each case. The switching may be done in a very time-optimizing manner, even without effect on the processing performance in the optimum case.

In contrast to method A, irrelevant states may be picked up only with difficulty since they need not be stored (according to U.S. Ser. No. 09/967,847 (PACT11). In special cases, however, they may be additionally stored within the debugging code similar to the locally relevant states, and/or a method may be used in which method A and B are used jointly.

However, it should be mentioned that there does not appear to be any requirement for storing this information in the VPU technology according to U.S. Pat. No. 6,425,068 B1 (PACT02). It is only when programmable sequences according to U.S. Ser. No. 10/009,649 (PACT13) are used instead of the SM unit U.S. Pat. No. 6,425,068 B1 (PACT02), that it may be useful to debug irrelevant states.

Example Embodiment of Operation of the Debugger

The debugger program itself may run on a DB outside the PA. The debugging information may be read by the debugger according to method A or B and stored in a memory and/or memory area separate from the data processing. The debugger program may define the breakpoints and (pre)conditions. The debugger program may also take over control of the execution of the application, particularly the start of execution and the end of execution.

The debugger according to the invention may also communicate with other tools and particularly also debuggers according to U.S. Ser. No. 09/967,498 (PACT20) within a development environment, as a result of which the control and definition of the debugging parameters may be taken over from another debugger. Similarly, the debugger may provide the debugging information generated by it to another debugger or obtain from the latter its debugging information.

The determination of the occurrence of breakpoints and/or (pre)conditions, in particular, may be performed by another debugger from the units debugged by this other debugger. The debugger according to the invention and the VPU may then respond correspondingly.

Evaluation of the Methods

Method A may be considerably more time- and resource-intensive than method B in which hardly any additional hardware may be required and moreover the time-consuming reading out of the debugging information from the start of the application may possibly be omitted. Method B may, therefore, be preferred in principle. However, applications which are formed by the compilation of normal HDL source codes onto a VPU may be scarcely suitable for applying method B. For compilers according to PACT11, however, method B must be clearly preferred.

DESCRIPTION OF THE FIGURES

Figure 2:
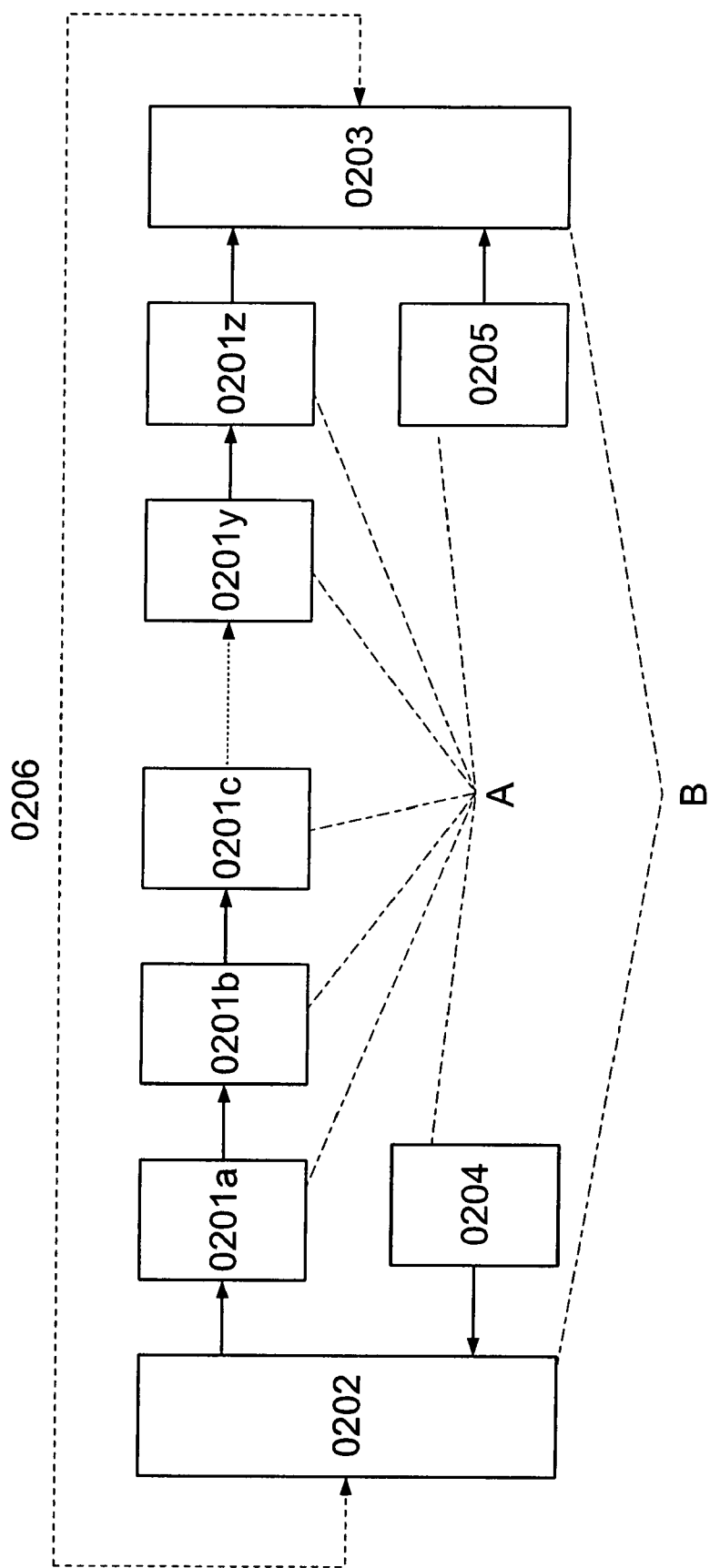
FIG. 2 illustrates an example embodiment of the mapping of a finite state machine onto a reconfigurable architecture.

FIGS. 1 and 2 may be associated with patent application PACT11. The different approaches of methods A and B have been drawn into the figures (A, B).

FIG. 1b illustrates a representation of an exemplary embodiment of the finite state machine by a reconfigurable architecture according to U.S. Pat. No. 5,943,242 (PACT01) and U.S. Pat. No. 6,088,795 (PACT04) (PACT04, FIGS. 12-15). The combinatorial network of FIG. 1a (0101) is replaced by an arrangement of PAEs 0107 (0101b). The register (0102) may be executed by a memory (0102b) which may store a number of cycles. The feedback according to 0105 may be done by 0105b. The inputs (0103b and 0104b, respectively) are equivalent to 0103 and 0104, respectively. The direct access to 0102b may be implemented by a bus by the array 0101b. The output 0106b is again equivalent to 0106.

FIG. 2 illustrates an example embodiment of the mapping of a finite state machine onto a reconfigurable architecture. 0201(x) represents the combinatorial network (which can be designed as PAEs according to FIG. 1b). There may be one or more memories for operands (0202) and one or more memories for results (0203). Additional data inputs/outputs according to 0103b, 0104b, 0106b are not shown for the sake of simplicity. The memories may be in each case associated with an address generator (0204, 0205). The operand and result memories (0202, 0203) may be physically or virtually coupled to one another in such a manner that, for example, the results of a function of one another may be used as operands and/or results and operands of a function of one another may be used as operands. Such coupling may be established, for example, by a bus systems or by a (re)configuration in accordance with which the function and networking of the memories with the 0201 s may be reconfigured.

Figure 3:
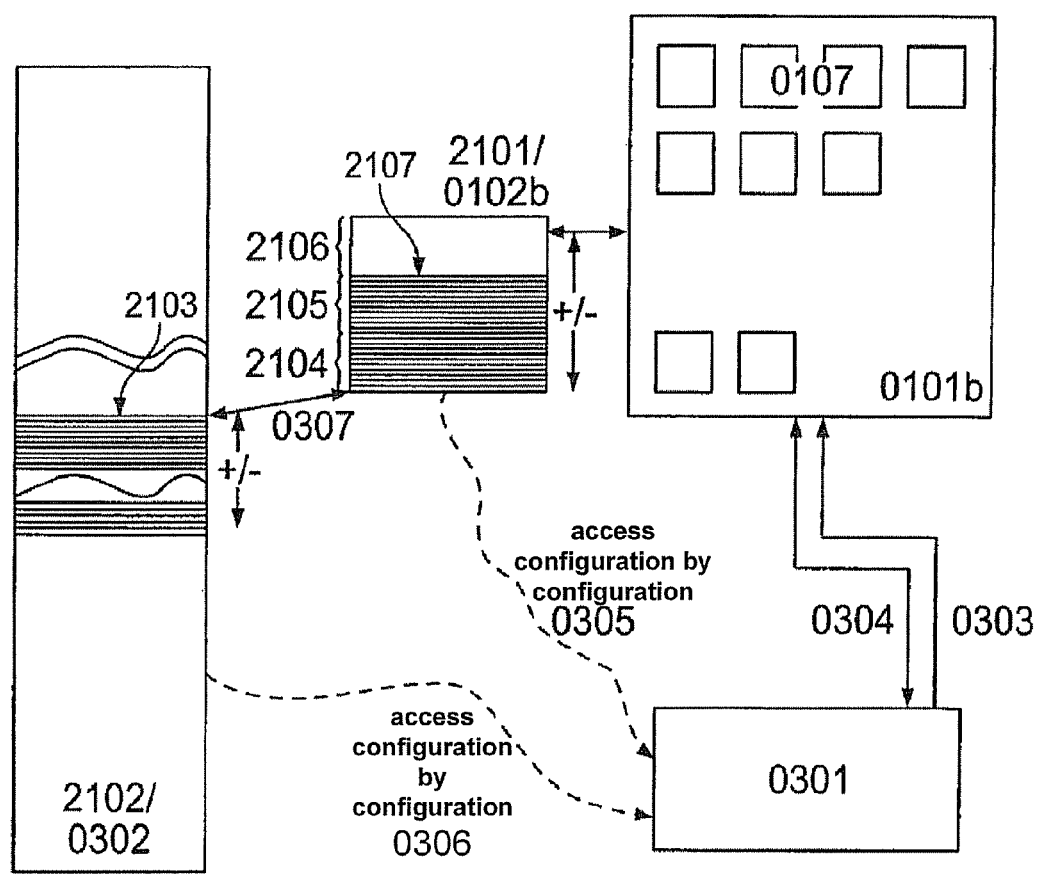
FIG. 3 illustrates an example embodiment of a diagrammatic structure of the debugging according to method B.

FIG. 3 illustrates an example embodiment of a diagrammatic structure of the debugging according to method B. Reference is made to FIGS. 19, 20, 21 of patent application U.S. Pat. No. 6,038,650(PACT13) in which the principle of the memories is described. U.S. Pat. No. 6,038,650 (PACT13) is herewith incorporated to its full extent.

0101b and 0102b are illustrated as already described. In addition, an external memory unit is shown (0302) which may possibly be connected (0307) to 0102b similar to U.S. Pat. No. 6,038,650 (PACT13). Reference is made to the fact that both 0102b and 0302 may be external or internal memory units. Similarly, a memory unit may need to be defined as at least one register, a set of registers or a memory (RAM, flash, hard disk or similar). The debugging unit 0301 may set breakpoints within 0101b (0303) on the basis of which the actual debugging process may be triggered. When a breakpoint is reached, an information item (0304) may be sent to 0301 which starts the debugging process; at the same time, all provisions for debugging internal to 0101b, (e.g. stopping and/or slowing down of the clock) may be triggered. As an alternative, information may also be generated by 0301 and sent to 0101b. 0301 may access the data and/or states from the memory 0102b and/or the memory 0302 via 0305 and/or 0306. The accessing may be done, for example, by
  1. shared memory (block move, i.e. copying the memories into another area controlled by 0301)
  2. a line (serial or parallel line via which one or more memory area(s) may be transmitted, e.g. JTAG)
  3. bus couplings of any type (the memories may be arbitrated similar to a DMA method and processed by 0301).

As an example, a figure from U.S. Ser. No. 10/009,649 (PACT13) has been selected. Reference is made to the fact that, in principle, every memory method and every shared memory (stack, random access, FIFO etc.) may be correspondingly processed.

The invention claimed is:

1. A method for debugging a program that defines a plurality of configurations for reconfigurable hardware, comprising:
   for each of at least some of the configurations forming part of the program to be debugged:
      executing the configuration on the reconfigurable hardware;
      writing debugging information from the reconfigurable hardware into a memory;
      reading, by a debugger, the debugging information from the memory; and
      evaluating the debugging information.

2. The method according to claim 1, wherein the hardware is reconfigurable with respect to at least one of a function and a networking configuration.

3. The method according to claim 2, wherein, for each of the at least some of the configurations, the execution of the configuration causes a configuration of the hardware with respect to the at least one the function and the networking configuration.

4. The method of claim 3, wherein the debugging information includes state information of a first of the at least some of the configurations used for a second of the at least some of the configurations.

5. The method of claim 2, wherein the memory is a random access memory (RAM).

6. A method for efficiently debugging a program defining a plurality of configurations to be successively processed on a dynamically reconfigurable architecture including a plurality of logic elements cooperating with each other, the method comprising:
   storing data in a memory in a configuration-conforming manner, the data generated by executing a configuration forming part of the program on the reconfigurable architecture, and including algorithmically relevant state data of the program that is associated with at least one of the configurations;
   subsequently continuing execution of the program, the execution including a reconfiguration; and
   detecting an error based on stored state data.

7. The method according to claim 6, wherein the memory includes an internal memory of the dynamically reconfigurable architecture in which the state data is stored.

8. The method according to claim 6, wherein for each state for which corresponding state data is to be stored, the state remains unchanged at least until the corresponding state data is stored.

9. The method according to claim 6, wherein the data are stored in an external memory and the state data relate to a state of the reconfigurable architecture after linking of operands.

10. The method according to claim 6, wherein the data includes state data that is associated with a configuration processed when the data is stored and that is not required following termination of the configuration.

11. The method according to claim 10, wherein the data further includes state data that is association with the configuration processed when the data is stored and that is required following termination of the configuration for a subsequent configuration.

12. The method according to claim 6, wherein debugging information is read out by a dedicated debug configuration, and normal program execution continues subsequent to the reading out of the debugging information.

13. A method for debugging a program that defines a plurality of configurations for reconfigurable hardware, comprising:

for at least one of the configurations forming part of the program to be debugged:

executing the configuration on the reconfigurable hardware;

writing debugging information from the reconfigurable hardware into a memory;

reading, by a debugger, the debugging information from the memory; and evaluating the debugging information.

* * * * *